(12) United States Patent
Tange et al.

(10) Patent No.: US 6,351,702 B1
(45) Date of Patent: Feb. 26, 2002

(54) APPARATUS AND METHOD FOR AUTOMATICALLY CONTROLLING VEHICULAR VELOCITY OF VEHICLE

(75) Inventors: Satoshi Tange, Kanagawa; Kenichi Egawa, Tokyo, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/482,729

(22) Filed: Jan. 14, 2000

(30) Foreign Application Priority Data

Jan. 14, 1999 (JP) ............................................. 11-008370

(51) Int. Cl.[7] .......................... B60T 7/12; B60K 31/00; G01S 13/58
(52) U.S. Cl. ......................... 701/96; 180/170; 342/109
(58) Field of Search .......................... 701/51–52, 65–66, 701/70–75, 78–94, 96–97, 110–111, 116–119, 124, 300–302; 180/170–171, 197, 201; 340/425.5, 435, 438, 463–467, 471–472; 342/104, 106–109

(56) References Cited

U.S. PATENT DOCUMENTS

| | | | | |
|---|---|---|---|---|
| 4,953,093 A | * | 8/1990 | Etoh ............................. | 701/95 |
| 5,871,062 A | | 2/1999 | Desens et al. ............... | 180/169 |
| 5,938,714 A | * | 8/1999 | Satonaka ..................... | 701/96 |

FOREIGN PATENT DOCUMENTS

| | | |
|---|---|---|
| DE | 196 20 928 | 11/1997 |
| EP | 0 612 641 | 8/1994 |
| EP | 0 838 363 | 4/1998 |
| EP | 0 965 477 | 12/1999 |
| JP | 3-153426 | 7/1991 |

* cited by examiner

Primary Examiner—William A. Cuchlinski, Jr.
Assistant Examiner—Thu Nguyen
(74) Attorney, Agent, or Firm—Foley & Lardner

(57) ABSTRACT

In apparatus and method for automatically controlling a vehicular velocity of an automotive vehicle maintaining an inter-vehicle distance to a preceding vehicle, a release of a follow-up run control (a vehicular run control) to control the vehicular velocity to follow up the preceding vehicle is smoothly carried out when a follow-up run release condition such that when the vehicle is running with a braking control executed on a road surface having a low frictional coefficient such as a wet road or snowy road. For example, when the vehicle is running under a follow-up run control to follow up the preceding vehicle and the release condition of the follow-up run control is established, a controller determines if the vehicle is under the braking control execution. If the vehicle is under the braking control, the follow-up run control is continued. Upon the end of the braking control, a follow-up run release flag FF is set to "1" and the follow-up run control is released. The release of the follow-up run control may be carried out after a predetermined interval of time has passed from a time at which the braking control is ended or may be carried out after the braking pressure is gradually reduced during the braking control.

23 Claims, 13 Drawing Sheets

APPARATUS AND METHOD FOR AUTOMATICALLY CONTROLLING VEHICULAR VELOCITY OF VEHICLE

BACKGROUND OF THE INVENTION a) Field of the Invention

The present invention relates to apparatus and method for automatically controlling a vehicular velocity for a vehicle so as to follow up a preceding vehicle which is running ahead of the vehicle, maintaining appropriately an inter-vehicle distance to the preceding vehicle.

b) Description of the Related Art

A Japanese Patent Application First Publication No. Heisei 3-153426 published on Jul. 1, 1991 exemplifies a previously proposed automatic vehicular velocity controlling system to maintain a set cruise speed of the vehicle (also, called an auto cruise speed control system).

In the disclosed auto cruise speed control system, an automatic cruise control function is provided to control the vehicular velocity so as to maintain the set vehicular velocity. If a wheel slip occurs on the vehicle in which the auto cruise control system is mounted, a traction control function is provided which reduces an engine output (torque or power) with an engine throttle valve closed according to a slip rate of the wheel slip. In this control, a traction control is outputted from a traction control system to the auto cruise control system. This auto cruise control system determines whether the traction control signal is inputted thereto during a normal auto cruise control operation. If the traction control signal is not inputted, the auto cruise control is continued. If the traction control signal is inputted, the auto-cruise control is inhibited with a higher priority placed on the traction control.

SUMMARY OF THE INVENTION

In the above-described previously proposed automatic cruise control system, the auto cruise control is inhibited with the traction control signal inputted to place a higher priority on the traction control so as to prevent both controls from being interfered against each other. However, since the control priority is placed on the traction control, the traction control is executed with the auto cruise speed control released when a road surface condition is transferred from a high frictional coefficient road surface such as a dry paved road to a low frictional coefficient road surface such as a snowy, a frozen, and a wet road.

In a case where if the above-described priority control is applied to a follow-up run control which is an evolution type of the auto cruise control and which maintains the inter-vehicle distance to a preceding vehicle which is running ahead of the vehicle constant, the preceding vehicle follow-up run control is released while the traction control is executed. To secure the inter-vehicle distance, the brake operation is needed with a vehicular driver.

Hence, it is, therefore, an object of the present invention to provide vehicular automatic vehicular velocity controlling apparatus and method in which an inter-vehicle distance is maintained by retarding a timing of a release of the follow-up run control under a brake control when the vehicle in which the automatic vehicular velocity controlling apparatus is mounted is running on a low frictional coefficient road surface.

According to one aspect of the present invention, there is provided with an apparatus for automatically controlling a vehicular velocity for a vehicle, comprising: an inter-vehicle distance detector to detect an inter-vehicle distance of the vehicle to a preceding vehicle which is running ahead of the vehicle; a target vehicular velocity variation rate calculating section that calculates a target vehicular velocity variation rate to make the detected inter-vehicle distance substantially equal to a target inter-vehicle distance; a vehicular run controlling section that is enabled to perform a vehicular run control to maintain the target vehicular velocity variation rate; a release condition detector to detect whether a release condition of the vehicular run control by the vehicular velocity controlling section is established; and a vehicular run control releasing section that releases the vehicular run control at a time at which a vehicular deceleration control is completed, when the vehicular run controlling section is detected to be performing the vehicular deceleration control and the release condition detector detects that the release condition is established.

According to another aspect of the present invention, there is provided with a method for automatically controlling a vehicular velocity for a vehicle, comprising: detecting an inter-vehicle distance of the vehicle to a preceding vehicle which is running ahead of the vehicle; calculating a target vehicular velocity variation rate to make the detected inter-vehicle distance substantially equal to a target inter-vehicle distance; performing a vehicular run control to maintain the target vehicular velocity variation rate; detecting whether a release condition of the vehicular run control is established; and releasing the vehicular run control at a time at which a vehicular deceleration control to perform the vehicular run control to maintain the target vehicular velocity variation rate is completed, when the vehicular deceleration control is performed and the release condition is established.

This summary of the invention does not necessarily describe all necessary features so that the invention may also be a sub-combination of these described features.

DETAILED DESCRIPTION OF THE PREFERRED EMBODIMENTS

Figure 1A:
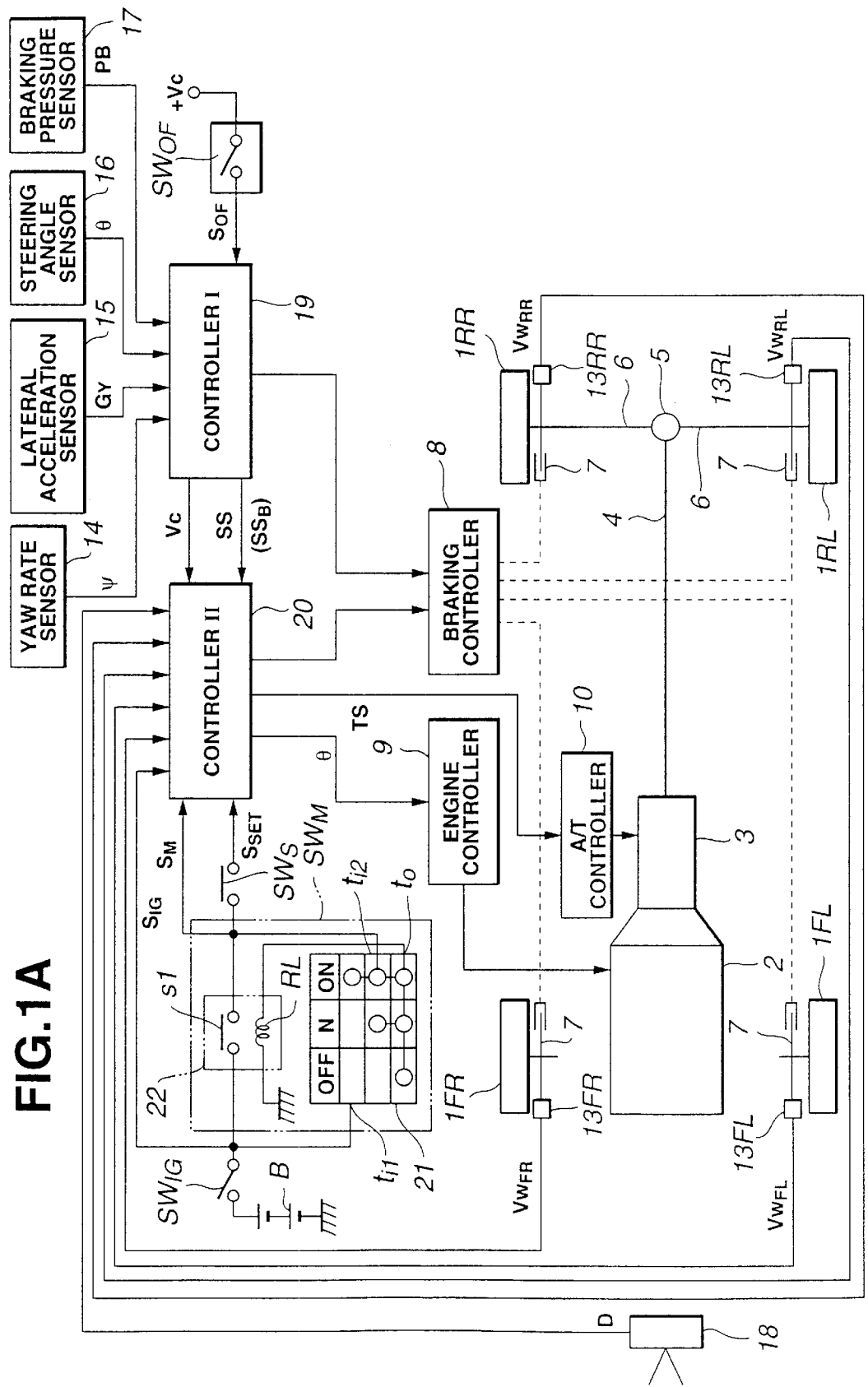
FIG. 1A is a rough configuration view indicating a first preferred embodiment of an automatic vehicular velocity controlling apparatus according to the present invention.

Reference will hereinafter be made to the drawings in order to facilitate a better understanding of the present invention.

First Embodiment

FIG. 1 shows a rough configuration view of a front-engine rear-drive automotive vehicle to which an apparatus for automatically controlling a vehicular velocity in a first preferred embodiment according to the present invention is applicable.

In FIG. 1, 1FL and 1FR denote front left and right road wheels as steered (non-driven) wheels and 1RL and 1RR denote rear left and right road wheels as driven wheels. The rear left and right road wheels 1RL and 1RR are driven to rotate with a driving force generated from an engine 2, via an automatic power transmission 3, a propeller shaft 4, a final speed reduction gear 5, and a wheel axle 6.

A plurality of disc brakes 7 are installed which operatively apply driving forces onto the respectively corresponding front left and right road wheels 1FL and 1FR and the rear left and right road wheels 1RL and 1RR and whose braking hydraulic pressures are individually or in an integrated manner controlled by means of a braking controller 8.

The braking controller 8 generates the braking hydraulic pressure in accordance with a depression of a brake pedal (not shown). The braking hydraulic is generated in accordance with a braking pressure command value from a run control purpose controller 20 (hereinafter, called simply a second controller (a controller II in FIG. 1A)).

The engine 2 is provided with an engine (output) controller 9 which adjustably controls an output of the engine 2. The engine (output) controller 9 adopts a method of adjusting an opening angle of a engine throttle valve and a method of adjusting an opening angle of an idling control valve to control an idling revolution of the engine 2. In the first embodiment, the engine output controller 9 adopts the adjustment of the opening degree of the throttle valve.

Furthermore, the automatic transmission 3 is provided with a transmission controller 10 which controls a gear shift position of the automatic transmission 3.

The automatic transmission controller 10 is constructed to perform an up-shift or down-shift of a gear position of the automatic transmission 3 upon receipt of an shift up or shift down command value TS from the follow-up run control purpose controller 20.

On the other hand, wheel velocity sensors 13FL, 13FR, 13RL, and 13RR are disposed to detect respective road wheel velocities of the front left and right and rear left and right road wheels 1FL, 1FR, 1RL, and 1RR. A yaw rate sensor 14 detects a yaw rate $\psi$ generated on the vehicle body, a lateral acceleration sensor 15 detects a lateral acceleration Gy generated on the vehicle body, a steering angle sensor 16 detects a steering wheel $\theta$ of a steering wheel (not shown), and a braking pressure sensor 17 detects a master cylinder pressure during a brake operation.

On the other hand, an inter-vehicle distance sensor 18 constituted by a radar unit is disposed on a front lower vehicular body part of the vehicle to detect an inter-vehicle distance of the vehicle to the preceding vehicle which is running ahead of the vehicle.

Each output signal of the road wheel velocity sensors 13FL, 13FR, 13RL, and 13RR, the yaw rate sensor 14, the lateral acceleration sensor 15, the steering angle sensor 16 and the braking pressure sensor 17 are inputted to a road surface situation dependent controller (viz., the first) controller 19 (a controller I in FIG. 1A).

The first controller 19 calculates a pseudo vehicular body velocity Vc on the basis of road wheel velocities VwFL, VwFR, VwRR, and VwRL detected by means of the respectively corresponding road wheel velocity sensors VwFL, VwFR, VwRL, and VwRR, calculates road wheel acceleration/decelerations (viz., a variation rate of each road wheel velocity) VwFL', VwFR', VwRR', and VwRL' by differentiating each corresponding road wheel velocity VwFL, VwFR, VwRL, and VwRR and executes an anti-lock brake control procedure on the basis of these values. When the anti-lock brake control procedure is not executed, the first controller 19 performs a driving force control which prevents slips on the driven wheels from occurring. Furthermore, while the driving force control procedure is not executed, such a sideslip supression control procedure as to make a steer characteristic stable is executed by making a sideslip angle (sideslip variable) on a low frictional coefficient road surface such as a snowy road, a frozen road coincident with a target sideslip angle based on a steering angular displacement by the vehicular driver and a brake manipulated variable (viz., a depression depth) on a brake pedal.

When either the driving force control or the sideslip angle suppression control procedure is executed, the execution state signal SS indicating a logical value "1" is outputted to the follow-up run control purpose (second) controller 20.

It is noted that the anti-lock brake control procedure calculates a wheel slip rate and the road wheel velocity variation rate of each road wheel on the basis of road wheel velocities VwFL, VwFR, VwRL, and VwRR of the respective road wheels 1FL, 1FR, 1RL, and 1RR and the pseudo vehicular body velocity Vc.

Then, the second controller 20 outputs a control command value to the braking controller 8 so that the actual slip rate and each vehicular road wheel velocity variation rate give a target road wheel slip rate. Thus, the braking pressure of each road wheel disc brake 7 is controlled.

In the driving force control procedure, the first controller 19 calculates the slip rate of the driven wheels according to the road wheel velocities VwRL, VwRR of the driven wheels 1RL and 1RR and the pseudo vehicular body velocity Vc, outputs the control command value to the braking controller 8 so that the slip rate is equal to or below a target slip rate, thus the braking pressure of the disc brake 7 on each road wheel being controlled.

Furthermore, in the sideslip angle suppression control procedure, the first controller 19 calculates the target slip angle based on the master cylinder pressure PB detected by the braking pressure sensor 17 and the steering angular displacement θ detected by the steering angle sensor 16, calculates the actual sideslip rate on the basis of the yaw rate ψ detected by the yaw rate sensor 14 and the lateral acceleration sensor 15, and outputs the control command value to the braking controller 8 to control the braking pressure for the disc brakes 7 for the respective wheels 1FL, 1FR, 1RL, and 1RR to make the calculated actual sideslip variable coincident with the target sideslip variable via the disc brakes 7 for the respective road wheels 1FL, 1FR, 1RR, 1RL.

In the sideslip angle suppression control procedure, the first controller 19 calculates a target sideslip angle (target sideslip variable Tar β) on the basis of the steering angular displacement detected by means of a steering angle sensor 16 and a master cylinder pressure PB detected by means of a braking pressure sensor 17.

The actual sideslip angle β is calculated (or estimated) on the basis of the yaw rate (yaw velocity) detected by means of the yaw rate sensor 14 and the lateral acceleration Gy detected by means of the lateral acceleration sensor 15. Thus, to make the calculated actual sideslip variable substantially equal to the target sideslip variable, the braking pressure against the disc brakes 7 on the respectively corresponding road wheels 1FL through 1RR are controlled by the braking controller 8 in response to the control command value outputted by the first controller 19 to make the steer characteristic of the vehicle that the vehicle driver intends.

In addition, in the road surface situation dependent purpose controller 19 (first controller), the anti-lock brake control procedure is at all times operable. The driving force control procedure and the sideslip control procedure are operable when a function off switch $SW_{OF}$ connected to the first controller 19 for making a countermeasure against a stack phenomenon is continued in an off state and are inoperable when the function off switch $SW_{OF}$ is in an off state.

On the other hand, the inter-vehicle distance D detected by the inter-vehicle distance sensor 18, the pseudo vehicular body velocity Vc outputted from the first controller 19, the execution status signal SS representing the driving force suppression control in the driving force control procedure and the sideslip angle suppression control in the sideslip control procedure, a switch signal $S_{IG}$ representing a status of an ignition switch $SW_{IG}$ connected to a vehicular battery B, a main switch signal $S_M$ representing a status to select to determine whether the follow-up run control should be carried out, and a switch signal $S_{SET}$ to set a vehicular velocity at which the follow-up run control is started inputted to the second controller 20.

The second controller 20 governs the braking controller 8, the engine output controller 9, and the transmission controller 10 on the basis of the pseudo vehicular body velocity Vc received from the first controller 19 and the inter-vehicle distance D detected by the inter-vehicle distance sensor 18 so that the preceding vehicle follow-up run control (the vehicular run control) is carried out maintaining an appropriate inter-vehicle distance to the preceding vehicle, determines that the vehicle is running on a low frictional coefficient road surface when the execution status signal SS representing the logical value of "1" is inputted from the first controller 19, and releases the preceding vehicle follow-up run control on condition that during the follow-up run control the braking control is being executed and, thereafter, the braking control in terms of the follow-up run control is ended.

It is noted that the main switch $SW_M$ includes a momentary type switch whose end is connected to the battery B via the ignition switch $SW_{IG}$ and which is operated by the driver's intention and a self-hold relay circuit 22.

When the momentary type switch 21 is placed at an off position, a first input terminal $t_{i1}$ at which a switch signal $S_{IG}$ is inputted and an output terminal $t_0$ are in an interrupted state. When it is in a neutral state, a second input terminal $t_{i2}$ to which a power supply from the relay circuit 22 is inputted and the output terminal $t_0$ are in the connection state. The relay circuit 22 includes: a normally open contact s1; and a relay coil RL driving the contact s1. One end of the normally open contact s1 is connected to an ignition switch $SW_{IG}$ and the other end is connected to the second controller 20 directly or indirectly via the set switch SWs and is connected to the second input terminal ti2 of the switch 21. One end of the relay contact RL is connected to an output terminal $t_0$ of the switch 21 and the other end is grounded.

Figure 1B:
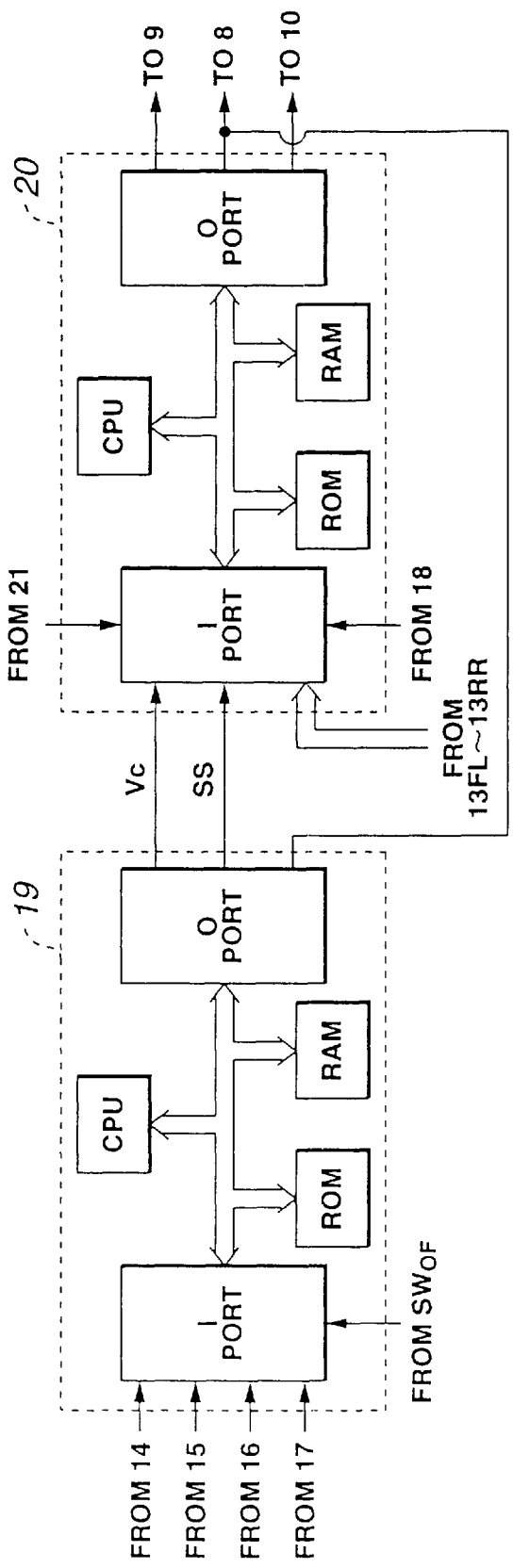
FIGS. 1B and 1C are respectively block diagrams of controllers I and II shown in FIG. 1A and an integrated controller.

It is noted that each of the first controller 19 and the second controller 20 is constituted by a microcomputer having a CPU (Central Processing Unit), ROM (Read Only Memory), a RAM (Random Access Memory), an Input Port, an Output Port, and a common (data and address) bus, as shown in FIG. 1B, in the first embodiment.

Figure 2:
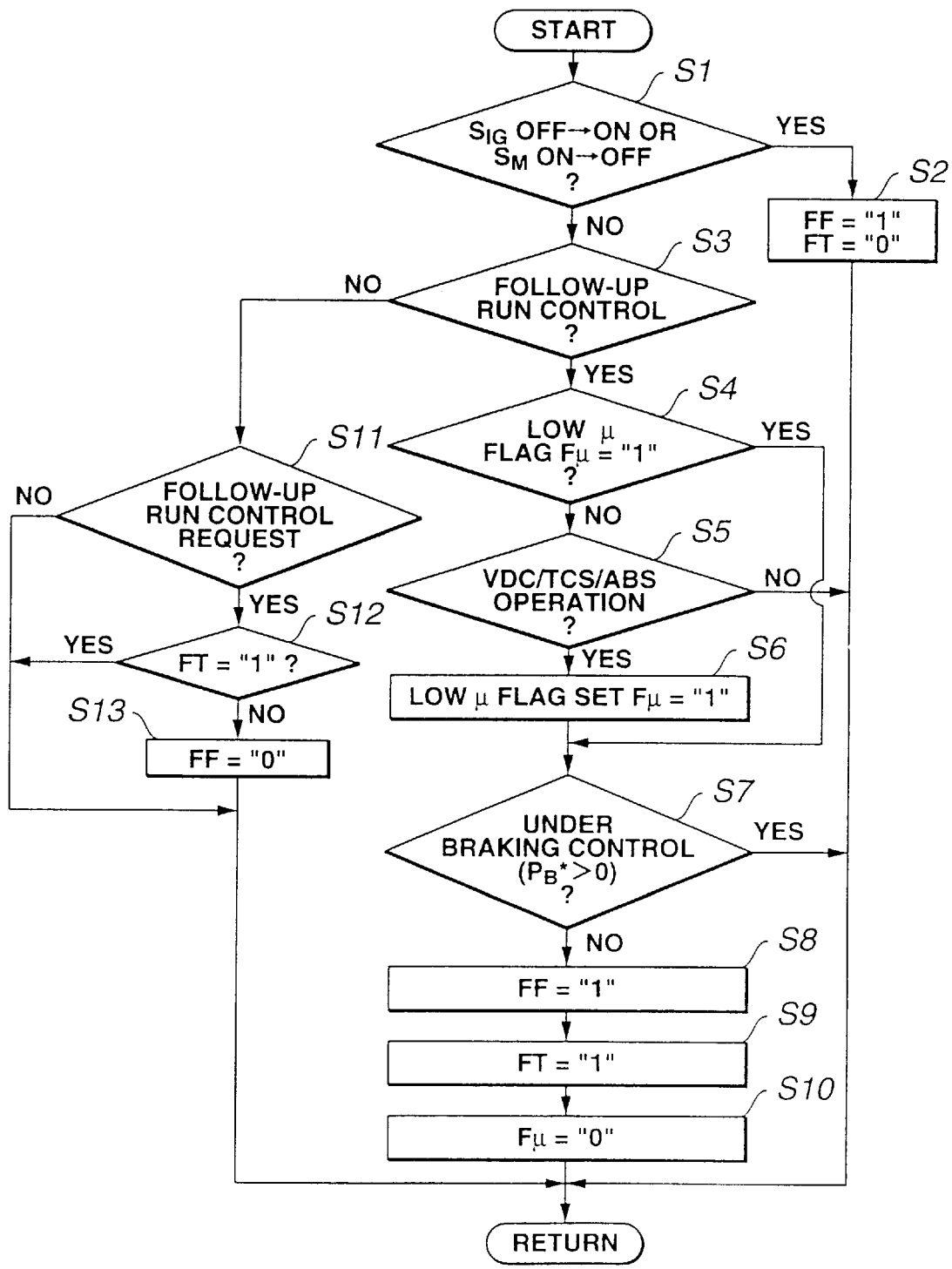
FIG. 2 is a flowchart representing one example of a follow-up run managing procedure in the controller I (viz., a follow-up run controller) shown in FIGS. 1A and 1B.
Figure 3:
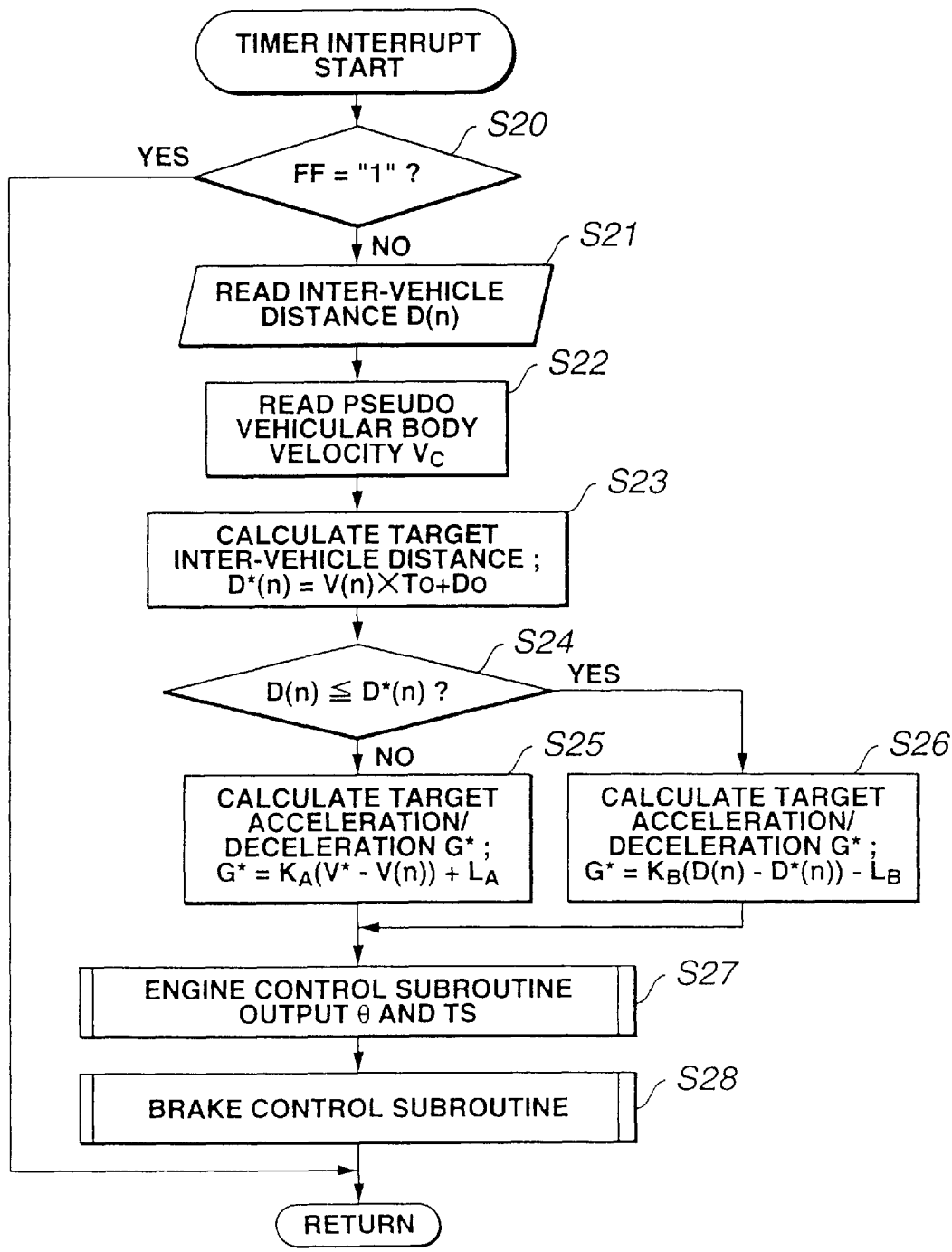
FIG. 3 is an operational flowchart representing another example of a follow-up run managing procedure executed in the controller shown in FIGS. 1A and 1B.

Next, FIGS. 2 and 3 show respectively show the preceding vehicle follow-up run control procedures executed by the second controller 20 in the first preferred embodiment shown in FIGS. 1A and 1B.

First, at the follow-up run control shown in FIG. 2 is executed as a timer interrupt processing for each predetermined interval of time (for example, 5 milliseconds) with respect to a min routine.

At a step S1, the CPU of the second controller 20 compares the present signal state of the switch signal $S_{IG}$ of the ignition switch $SW_{IG}$ with a previous switch state thereof and compares the present signal state of the switch signal $S_M$ of the main switch $SW_M$ with the previous one to determine either whether the switch signal $S_{IG}$ of the ignition switch $SW_{IG}$ is changed from the on state to the off state or whether the switch signal $S_M$ of the main switch $SW_M$ is changed from the on state to the off state.

If a result of determination indicates that the switch signal $S_{IG}$ is changed from the off state to the on state or that the switch signal $S_M$ is changed from the on state to the off state (Yes) at the step S1, the interrupt routine goes to a step S2. At the step S2, the CPU of the second controller 20 assigns a logical value of "1" into a follow-up run control release flag FF to represent that the follow-up run control is in a release state and assigns a logical value of "0" into an operation history flag FT to reset the flag FT to "1". Then, the present interrupt routine is ended.

If the CPU of the second controller 20 determines that the switch signal $S_{IG}$ is changed from the on state to the off state, that the switch signal $S_M$ is changed from the off state to the on state, or that no state change occurs on the switch signal $S_{IG}$ and $S_M$ (No) at the step S1, the interrupt routine goes to a step S3.

At the step S3, the CPU of the second controller 20 determines whether the vehicular velocity is presently controlled in the follow-up run control mode. That is to say, the CPU of the second controller 20 compares the status of the follow-up run control release flag FF with the logical value of "1" to determine whether the flag status of the flag FF indicates "1". If FF="0" (yes) at the step S3, the CPU of the second controller 20 determines that the follow-up run control is being executed and the routine goes to a step S4.

At the step S4, the CPU of the controller 20 compares a low frictional coefficient road surface flag Fμ with "1" to determine whether this flag Fμ is set to "1".

If Fμ="0" (No) at the step S4, the routine goes to a step S5 since the CPU of the second controller 20 determines that the vehicle is not running on the low frictional coefficient road surface at the step S4 but is running on a high frictional coefficient road surface such as a dry paved road.

At the step S5, the CPU of the second controller 20 determines whether the first controller 19 is executing any one of the anti-lock brake control (ABS), driving force control (TCS), or the sideslip angle suppression control (VDC). This determination is based on whether the execution state signal SS inputted from the first controller 19 indicates the logical value of "1".

If SS≠"1" (SS="0") at the step S5 (No), the present interrupt routine is ended.

If SS="1" (Yes) at the step S5, the interrupt routine goes to a step S6 to set the low μ road surface flag Fμ to "1" and the routine goes to a step S7. At the step S7, the CPU of the second controller 20 determines whether in the follow-up run control shown in FIG. 3 the vehicle is under the braking control. This determination is based on whether a target braking pressure $P_B^*$ calculated at a step S28 shown in FIG. 3 is positive. If $P_B^*>0$ (yes) at a step S7, the present interrupt routine is ended.

If $P_B^*\leq 0$ (No) at the step S7 (no braking control is executed or the braking control is ended), the routine goes to a step S8.

The follow-up run control release flag FF is set to "1" to release the follow-up run at the step S8. At the next step S9, the operation history flag FT representing that any one of the anti-lock brake control, the driving force suppression control, or the sideslip angle suppression control is executing so that and the vehicle is detected to be running on the low frictional coefficient road surface is set to "1". At the next step S10, the low μ road surface flag Fμ is reset to "0". Then, the present interrupt routine is ended.

On the other hand, if FF="1" at the step S3 (No) (FF≠0), the routine branches to a step S11.

At the step S11, the CPU of the second controller 20 determines whether there is a request to carry out the follow-up run control. This determination is based on whether both of the main switch $SW_M$ and the set switch SWs are in the on state and the switch signal $S_{SET}$ is in the on state.

If the switch signal $S_{SET}$ is in the on state, the CPU of the second controller 20 determines that there is the request to carry out the follow-up run control or the follow-up run control should be continued and the routine goes to a step S12.

At the step S12, the CPU of the second controller 20 determines whether the operation history flag FT is at a "1".

If FT="0" (No) at the step S12, the routine goes to a step S13.

At the step S13, the follow-up run control release flag FT is reset to "0" to enable the follow-up run control and the present interrupt routine is ended.

If FT="1" (yes) at the step S12, the present interrupt routine is directly ended.

In addition, if the switch signal $S_{SET}$ remains in the on state and no request to start the follow-up run control is present (No) at the step S11, the present interrupt routine is ended.

Referring to FIG. 3, the follow-up run control procedure shown in FIG. 3 is executed whenever the predetermined interval of time has passed (for example, 5 milliseconds) with respect to the main program as a timer interrupt routine.

At a step S20, the CPU of the second controller 20 determines whether the follow-up run control release flag FF is set to "1". If set at "1" (FF=1), the CPU of the controller 20 determines that the follow-up run control is released and the present interrupt routine is ended to return to the main routine. If FF="0" (No) at the step S20, the routine goes to a step S21.

At the step S21, the CPU of the second controller 20 reads the inter-vehicle distance D to the actual preceding vehicle detected by means of the inter-vehicle distance sensor 18 and the present interrupt routine goes to a step S22.

At the step S22, the first controller 19 reads the pseudo vehicular body velocity Vc(n) and the routine goes to a step S23 (n=1, 2, 3, - - - ).

At the step S23, the CPU of the second controller 20 calculates a target inter-vehicle distance D* between the vehicle and the preceding vehicle in accordance with the following equation (1) from the pseudo vehicular body velocity Vc(n) and a time duration $T_0$ (also called, an inter-vehicle time duration) for which the vehicle reaches to a position Lo meters behind the present preceding vehicle.

$$D^*(n)=Vc(n)\times T_0+D_0 \tag{1}$$

By introducing a concept of the inter-vehicle time duration, as the vehicular velocity becomes fast, the inter-vehicle distance becomes wide.

It is noted that $D_0$ in the equation (1) denotes an inter-vehicle distance during a vehicular stop.

Next, at a step S24, the CPU of the second controller 20 determines whether the inter-vehicle distance D(n) is equal to or shorter than the target inter-vehicle distance D*(n). If D(n)>D*(n) at the step S24, the routine goes to a step S25 in which the CPU of the second controller 20 calculates the target vehicular velocity variation rate(acceleration/deceleration) G* in accordance with the following equation (2) on the basis of a preset target vehicular velocity V*, and stores it into a memory location in which the previously calculated target vehicular velocity variation rate is stored so as to update G*. Then, the routine goes to a step S27.

$$G^*=K_A\times(V^*-Vc(n))+L_A \tag{2}$$

It is noted that, in the equation (2), $K_A$ denotes an inter-vehicle time duration gain and $L_A$ denotes a constant.

On the other hand, if the result of determination at the step S24 indicates that D(n)≦D*(n), the CPU of the second controller 20 determines that the inter-vehicle distance D(n) is shorter than D*(n) and it is necessary to widen the inter-vehicle distance and the routine goes to a step S26. At the step S26, the CPU of the second controller 20 calculates the target vehicular velocity variation rate G* in accordance with the following equation (3) and stores it into the memory location to update the value of the target vehicular velocity variation rate G*.

$$G^*=K_B\times(D(n)-D^*(n))-L_B \tag{3}$$

It is noted that, in the equation (3), $K_B$ denotes the inter-vehicle distance time duration control gain and $L_B$ denotes the constant.

At the step S27, the CPU of the second controller 20 calculates a command value θ of an opening degree of the engine throttle valve for the engine (output) controller 9, the command value TS to make an up-shift or down-shaft of the gear for the transmission controller 10, and outputs these command values to the controllers 9 and 10 in which an engine output control procedure is executed and a gear shift control is executed and the routine goes to a step S28.

If G*>0 and the vehicle is being accelerated, the command value θ of the throttle valve is calculated as follows: a variation rate Δθ of the opening angle of the throttle valve is calculated which increases according to the increase in the target vehicular velocity variation rate.

If G*<0, the variation rate Δθ of the opening degree of the throttle valve is calculated which increases in a negative direction as the target vehicular velocity variation rate increases in the negative direction while the target vehicular velocity variation rate G* reaches from zero to a negative predetermined value −Gs. The calculated variation rate Δθ of the opening degree of the throttle valve is added to the present command value θ of the throttle valve. If the target vehicular velocity variation rate G* is in excess of the negative predetermined value −Gs, the command value θ of the throttle valve is set to "0" or its neighboring value.

The up-shift/down-shift command value TS is calculated on the basis of the calculated command value θ of the opening degree of the throttle valve and the vehicular velocity V(n), referring to a gear shift schedule map in the same manner as the gear shift control in the normally available automatic transmission 3.

At the step S28, the CPU of the second controller 20 calculates the target braking pressure $P_B^*$ on the basis of the target vehicular velocity variation rate G* stored in the corresponding memory location and outputs the target $P_B^*$ to the braking controller 8. Thereafter, the present interrupt routine is ended and returns to the main routine.

Figure 4:
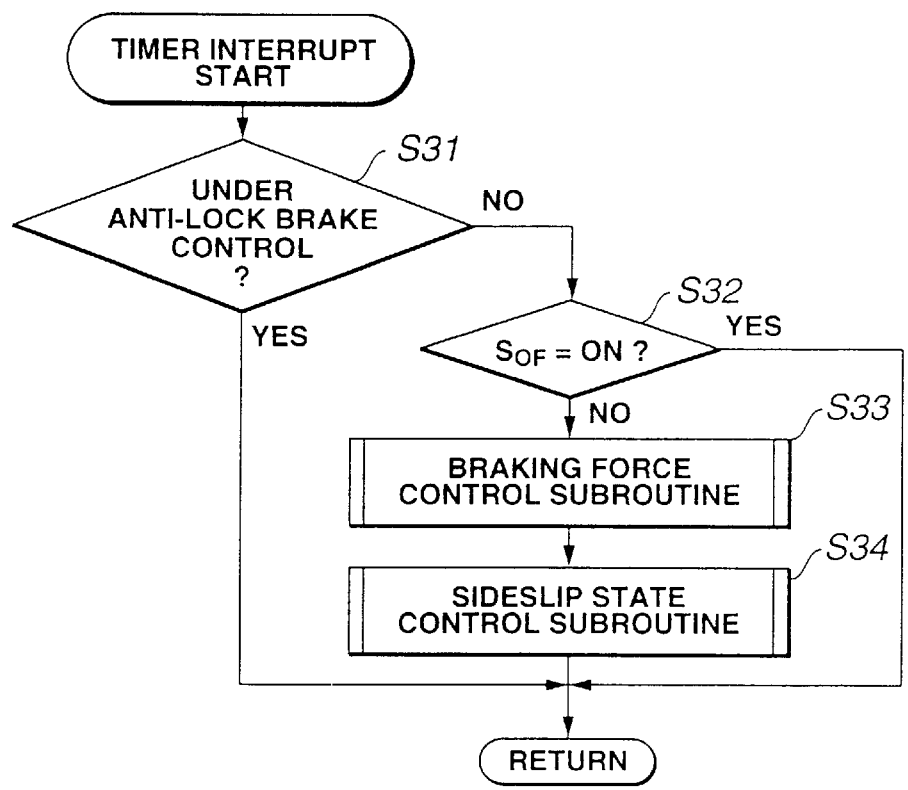
FIG. 4 is an operational flowchart representing one example of a road surface situation dependent control procedure executed in the controller I shown in FIG. 1A.

At the step S28, the CPU of the second controller 20 refers to a braking pressure calculation map shown in FIG. 4 previously stored in the memory on the basis of the target vehicular velocity variation rate G* to derive the target braking pressure $P_B^*$.

Figure 5:
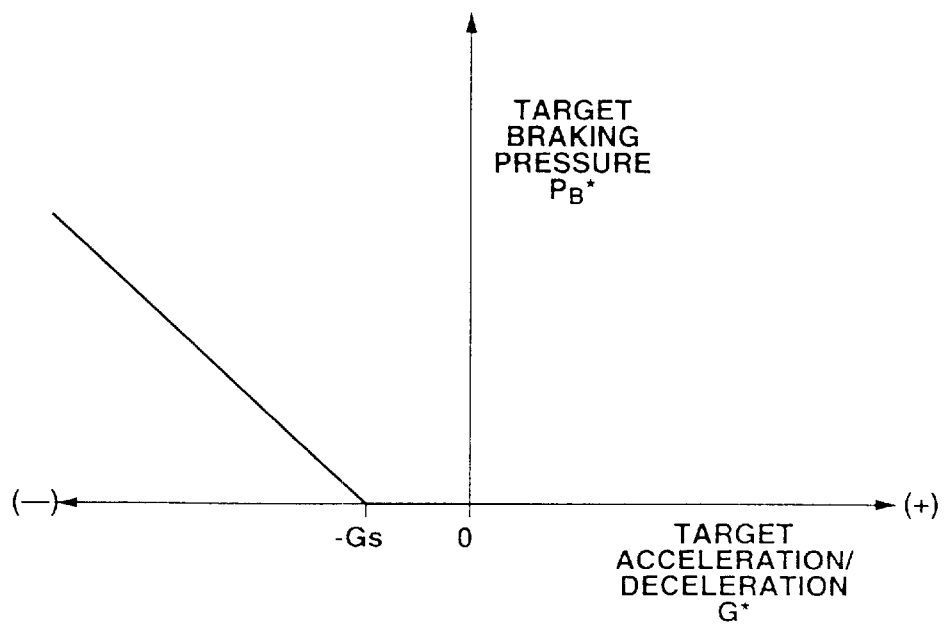
FIG. 5 is an explanatory view representing one example of a calculation map (stored in a two-dimensional array) on a target braking pressure representing a target acceleration/deceleration and a target braking pressure.

The braking pressure calculation map (a two-dimensional array) is shown in FIG. 5. With the target vehicular velocity variation rate G* taken along a longitudinal axis and the target braking pressure $P_B^*$ taken along a lateral axis, the target braking pressure $P_B^*$ is maintained at "0" while the target vehicular velocity variation rate G* is positive. While the target vehicular velocity variation rate G* is negative and exceeds the negative predetermined value −Gs, the target braking pressure $P_B^*$ is increased in a linear fashion in proportion to the negative direction increase of the target vehicular velocity variation rate G*.

The first controller 19 executes a road surface situation-dependent vehicular run control procedure shown in FIG. 4.

The road surface situation-dependent vehicular run control procedure is executed for each predetermined interval of time with respect to the anti-lock brake control procedure executed in the form of the main routine, as the timer interrupt routine.

At a step S31, the CPU of the second controller 19 determines if the anti-lock brake control procedure is being executed.

This determination is based on whether an under execution flag is set to "1" or reset to "0".

The under execution flag is set to "1" when the wheel cylinder pressure falls in a pressure decrease state during a start of the braking operation and is reset to "0" when a predetermined release condition such that any one of the vehicular velocity which gives a value approximately zero, a number of times moderate pressure increases are carried out which are equal to or greater than a predetermined value or the brake manipulation (brake pedal depression is released) which is released is satisfied. If the under execution flag is set to "1", the CPU of the first controller 19 determines that the anti-lock brake control is being executed and the present timer interrupt processing is ended to return to the main routine anti-lock brake control. If the under execution flag is reset to "0", the CPU of the second controller 20 determines that the present time is not under the anti-lock brake control and goes to a step S32.

At a step S22, the CPU of the first controller 20 determines that the function off switch $SW_{OF}$ connected to the road surface dependent vehicular run control purpose (first) controller 19 is turned on and its switch signal $S_{OF}$ is in the on state.

If $SW_{OF}$ indicates the on state, the CPU of the first controller 19 determines that there is a non-operation request to operate neither the driving force suppression control procedure nor the sideslip angle suppression control procedure and the present timer interrupt routine is ended to return to the anti-lock brake control procedure. If the switch signal $S_{OF}$ is in the off state, the CPU of the first controller 19 determines that there is the request to execute the driving force suppression control procedure and sideslip angle suppression control procedure and the present routine goes to a step S33. At the step S32, the driving force control procedure (subroutine) is executed. At the next step S34, the sideslip angle suppression control procedure (subroutine) is executed and the timer interrupt routine is ended to return to the anti-lock brake control main routine.

It is noted that when the driving force suppression control at the step S33 and the sideslip angle suppression control at the step S34 are started, the execution state signal SS is changed from the logical value of "0" to the logical value of "1".

The processes at the steps S3 through S8 in FIG. 2 and at the step S20 in FIG. 3 correspond to the run control release means, those at the steps S21 through S28 shown in FIG. 3 correspond to the follow-up run control means, and those at the steps S33 and S34 correspond to road surface condition control means.

Hence, suppose now that the vehicle stops on the high frictional coefficient road surface with a key switch (not shown) and the ignition switch SWIG turned off and the set switch SWs turned off. In this state, the power supply to each of the first and second controllers 19 and 20 is turned off. Together with the anti-lock brake control, the driving force control, and the sideslip angle suppression control procedures in the non-operation state, the follow-up run managing and the follow-up run control procedures are in the non-operation state.

Under the vehicular stop state, the key switch is turned on and the subsequent ignition switch $SW_{IG}$ is turned on to start the engine 2.

At this time, since the vehicle is in the stop state, the road surface condition run control purpose (first) controller 19 executes neither the anti-lock brake control, the driving force suppression control, nor the sideslip angle suppression control.

First, the second controller 20 executes the follow-up run managing procedure shown in FIG. 2.

Since the status change in the ignition switch $SW_{IG}$ occurs from the off state to the on state, the routine of FIG. 2 goes from the step S1 to the step S2.

At the step S2, the operation history flag FT representing that any one of the anti-lock brake control procedure, the driving force control procedure, or the sideslip angle suppression control procedure is executing is reset to "0". Then, after the initialization process to set the follow-up run control release flag FF to "1" is carried out, the timer interrupt process is ended.

At the subsequent timer interrupt period, the routine goes from the step S1 to the step S3 in which the follow-up run release flag FF is set to "1" and the routine goes to the step S11.

At this time, suppose that the change-over switch 21 of the main switch $SW_M$ is not operated and is placed at the neutral position.

Since an input terminal ti1 connected to the ignition switch $SW_{IG}$ becomes non-conduction state with the output terminal t0 connected to the relay coil RL, the normally open contact s1 maintains the open state and the switch signal $S_{SET}$ maintains the off state irrespective of the state of the set switch SWs.

The CPU of the second controller 20 determines that there is no request by the vehicular driver to control the vehicular velocity to follow-up the preceding vehicle and ends directly to the timer interrupt processing.

When the predetermined interval of time has passed and the follow-up run control procedure of FIG. 3 is started, hence, the timer interrupt routine from the step S20 is directly ended to return to the follow-up run managing procedure at the step S2. Thus, the state in which the follow-up run control is released is maintained.

Then, in a case where the vehicle stops, thereafter, the vehicle is started to run on a high frictional coefficient road surface, and the follow-up run control to follow up the preceding vehicle is carried out, the change-over switch 21 is operated in the on position so that the first input terminal ti1 and the output terminal t0 are conductive. Thus, the relay coil RL become conduction state with the normally open contact s1 closed and the switch signal $S_M$ becomes on state so that the self-hold circuit is formed which constitutes the output end of the relay coil, the second input terminal ti2, the output terminal t0, and the input end of the relay coil RL.

If the operation of the change-over switch 21 is released under the above-described state, the switch 21 is returned to the switch at the neutral position. At this time, since, at the neutral position, the conduction state between the second input terminal ti2 and the output terminal t0 is maintained, the self-hold state of the relay circuit 22 is continued.

As described above, with the main switch $S_M$ turned on, the set switch SWs turned on, and the switch signal $S_{SET}$ turned on, these series of switching information is inputted to the second controller 20.

Hence, since the routine of FIG. 2 goes from the step S11 to the step S12 and the operation history flag FT is reset to "0", the routine goes to the step S13 in which the follow-up run control release flag FF is reset to "0" and the timer interrupt processing is ended.

Therefore, at timings at which the timer interrupt processing of FIG. 3 is executed for the respective predetermined intervals of times, the routine of FIG. 3 is transferred from the step 20 to the step S21. Hence, the follow-up run control is started on the basis of the inter-vehicle distance D and the pseudo vehicular body velocity Vc.

In the follow-up run control mode, when no preceding vehicle is present in a forward detection zone of the inter-vehicle distance sensor 18, the set vehicular velocity is maintained. If the preceding vehicle is present, the target vehicular velocity variation rate G* is calculated on the basis of the inter-vehicle distance D and the target inter-vehicle distance D*. Accordingly, the engine output control and the braking control procedures are executed so that the follow-up run control to maintain the target inter-vehicle distance D* in accordance with the pseudo vehicular body velocity Vc.

When the follow-up run control is started, the vehicle being running on a high frictional coefficient road surface, the routine of FIG. 2 goes from the step S3 to the step S4 in the follow-up run managing procedure. If the low $\mu$ ($\mu$ denotes a frictional coefficient) road surface flag $F\mu$ is reset to "0" due to the initialization processing, the routine goes to the step S5. When neither the anti-lock brake control, the driving force suppression control, nor the sideslip angle suppression control is executed, the present timer interrupt processing is directly ended. Hence, the follow-up run release flag FF is maintained at the reset state of "0" so that the follow-up run control shown in FIG. 3 is continued.

Suppose that during the follow-up run control on the high frictional coefficient road surface, the vehicle runs on the low frictional coefficient road surface such as a snowy road or frozen road. Then, with the follow-up run control in the braking mode to widen the inter-vehicle distance, the road wheels have become lock tendencies to execute the anti-lock brake control, the driven wheel slips to execute the driving force suppression control, or the sideslip occurs during the cornering to execute the sideslip angle suppression control.

At this time, since the execution state signal SS outputted from the first controller 19 indicates the logical value of "1", the routine shown in FIG. 2 goes from the step S5 to the step S6. Then, the low $\mu$ road surface flag $F\mu$ is set to "1". Then, the routine goes to the step S7. If the target braking pressure $P_B^*$ calculated at the follow-up run control procedure shown in FIG. 3 indicates "0" to represent the non-braking state, the routine of FIG. 2 goes to the step S8 so that the follow-up run control release flag FF is set to "1". Hence, the routine of FIG. 3 goes from the step S20 to the end. Then, the follow-up run control is immediately released. Since the acceleration on the low frictional coefficient road surface is lower than that on the high frictional coefficient road surface. Hence, the actual inter-vehicle distance D becomes wider than the target inter-vehicle distance. Consequently, the first controller 19 can assure the prevention of an easiness in developing the road wheel slips.

However, suppose that the execution status signal SS outputted from the first controller 19 indicates the logical value of "1" and the low $\mu$ road surface flag $F\mu$ is set to "1". The braking control to widen the inter-vehicle distance D in the follow-up run control procedure of FIG. 3 is carried out. If the target braking pressure $P_B^*$ is positive, the timer interrupt processing is ended directly from the step S7. The follow-up run control procedure in FIG. 3 is continued to widen the inter-vehicle distance D with the braking control continued. When the inter-vehicle distance D is widened and the inter-vehicle distance D gives the optimum value, the braking control is stopped and the target braking pressure $P_B^*$ indicates "0".

Hence, since the low $\mu$ road surface flag $F\mu$ is set to "1" at the processing of FIG. 2, the routine of FIG. 2 jumps from the step S4 to the step S7. Since the target braking pressure $P_B^*$ indicates "0", the routine goes from the step S7 to the step S8. Since the follow-up run control release flag FF is set to "1", the follow-up run control is released, and the braking state is released during the operation of the braking control so that the further narrower inter-vehicle distance D can be avoided from occurring to improve an inter-vehicle distance safety.

In addition, although the operation history flag FT is set to "1" at the step S9 (shown in FIG. 2), the switch signal $S_{SET}$ of the set switch SWs is maintained at the on state.

Hence, the present routine is transferred from the step S3 to the step S12 via the step S11. However, since the operation history flag FT is at the "1", the timer interrupt processing is ended to be enabled to prevent the follow-up run from being started.

While the follow-up run control procedure is released, the functional coefficient on which the vehicle is running is changed from the low frictional coefficient to the high frictional coefficient and the driver is operated with the main switch $SW_M$ at the off position. The status of the switch signal $S_M$ is changed from the on state to the off state. Thus, the routine is transferred from the step S1 to the step S2. Hence, the follow-up run control release flag FF is set to "1". However, the operation history flag FT is reset to "0". Under this condition, the main switch $SW_M$ is again operated to the on position. Hence, at the next processing, the routine goes from the step S1 to the step S13 via the steps S3, S11, and S12 and the follow-up run control release flag FF is reset to "0". Hence, the follow-up run control procedure shown in FIG. 3 is restarted.

In addition, the vehicle stops while the follow-up run control is continued. If the ignition switch $SW_{IG}$ is turned off, the power supply from the battery B inputted to the normally open contact s1 of the relay circuit 22 of the main switch $SW_M$ is interrupted. Hence, the self-hold state is released so that the main switch $SW_M$ is turned off. This off state is continued until after the ignition switch $SW_{IG}$ is again turned on, the switch 21 is operated to the on position. Consequently, an abrupt start of the follow-up run control can be prevented.

Second Embodiment

Figure 6:
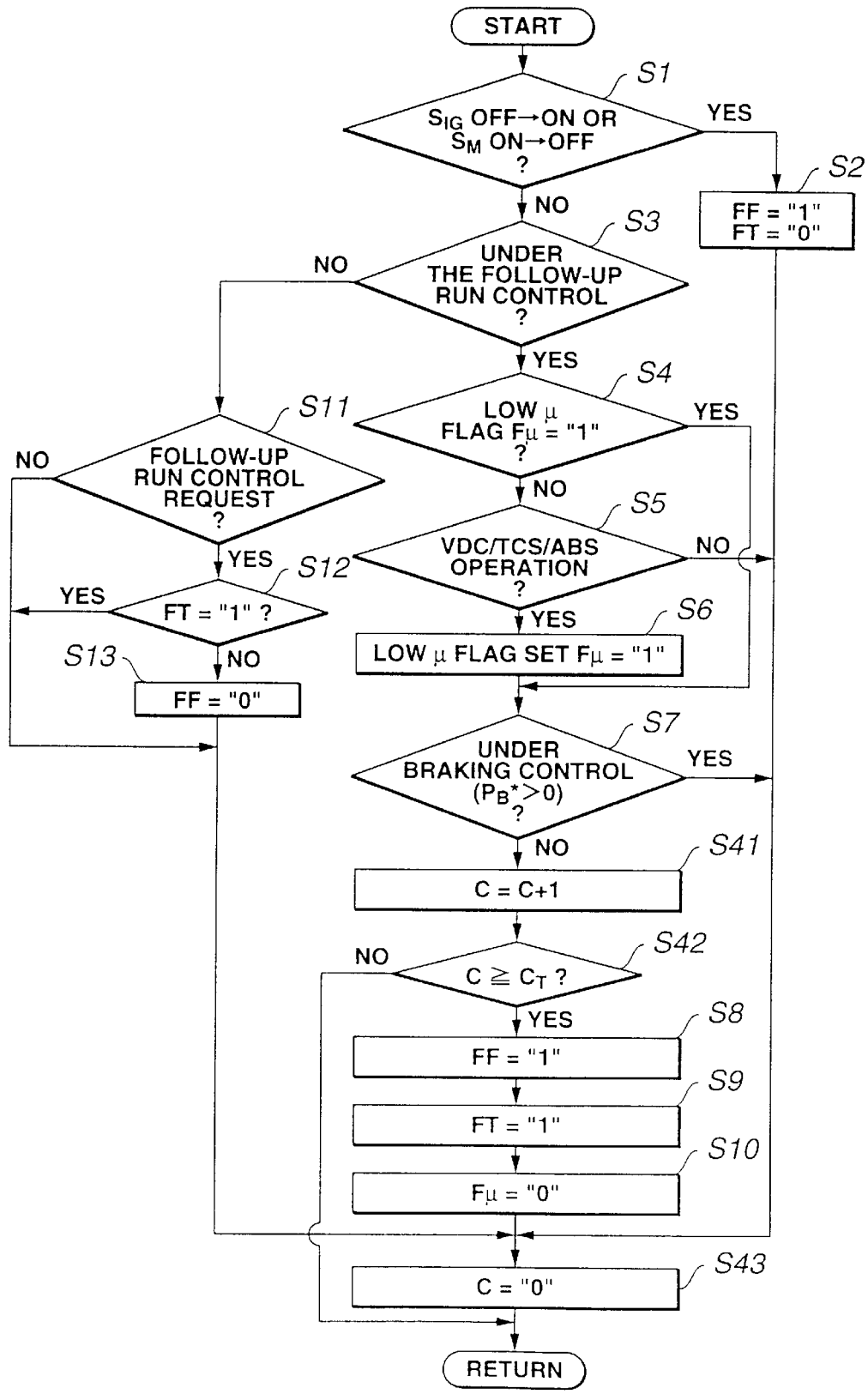
FIG. 6 is an operational flowchart representing the follow-up run managing procedure in a second preferred embodiment according to the present invention.

Next, FIG. 6 shows a flowchart representing a second preferred embodiment of the automatic vehicular velocity controlling apparatus according to the present invention.

It is noted that in a case where the low frictional coefficient road surface is detected, the follow-up run control is released after the predetermined interval of time has passed after the braking control is ended during the braking control.

That is to say, in the second embodiment according to the present invention, as shown in FIG. 6, a step S41 at which a count value C of a delay counter is incremented by one (C+1→C) is interposed between the steps S7 and S8 shown in FIG. 6, a step S42 at which the count value C of the delay counter has reached to a preset value $C_T$ (for example, the count value corresponds to 3 seconds) is interposed between the steps S41 and S8, and a step S43 at which the count value C of the delay counter is cleared to zero (C→"0") is added after the step S10.

If the count value C of the delay counter has reached to the preset value $C_T$ (C≧$C_T$) at the step S42, the routine of FIG. 6 enters the step S8. If not yet reached to the preset value (No) (C<$C_T$) at the step S42, the routine jumps to RETURN of FIG. 6.

The other steps shown in FIG. 6 are the same as those shown in FIG. 2. The detailed description of these steps will herein be omitted.

In the second embodiment, when the CPU of the first controller 19 executes any one of the anti-lock brake control, the driving force suppression control, and the sideslip angle suppression control during the execution of the follow-up run control, so that the CPU of the second controller 20 determines that the vehicle is running on the low frictional coefficient road surface. In this case, the braking control is carried out to widen the inter-vehicle distance D at the follow-up run control procedure shown in FIG. 3.

Then, if $P_B^*>0$, the CPU of the first controller 20, viz., the follow-up run control procedure is in a wait state. However, if the inter-vehicle distance D gives the appropriate distance (or the target inter-vehicle distance) and the braking control is ended, the target vehicular velocity variation rate $P_B^*$ indicates zero. At this time, the routine shown in FIG. 6 goes from the step S7 to the step S41 in which the count value C of the delay counter is incremented. Until the count value C has reached to the preset value CT, the follow-up run control is continued. If C≧$C_T$, the follow-up run control is released.

Therefore, immediately after the braking process is ended with the appropriate inter-vehicle distance secured according to the first time braking control during the vehicular run on the low frictional coefficient road surface such as the snowy road or frozen road, the preceding vehicle is in the braking control so that it becomes possible in the follow-up run control to again be transferred to the braking state. Consequently, a burden on the vehicular driver is relieved so as to give a psychological margin to the vehicular driver.

It is noted that the other structure of the second embodiment is the same as that described in the first embodiment.

Third Embodiment

Figure 7:
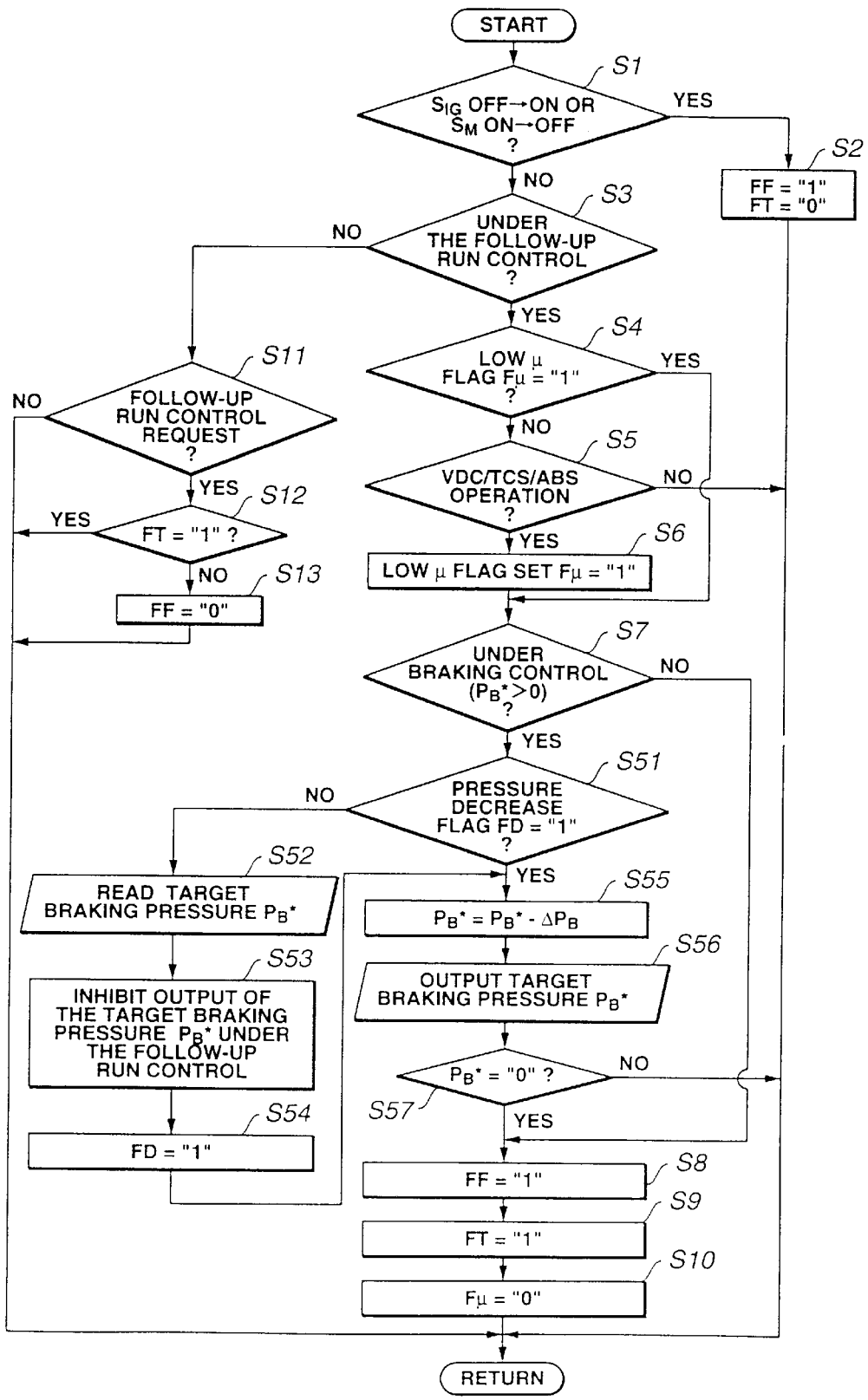
FIG. 7 is an operational flowchart representing a follow-up run managing procedure in a third preferred embodiment according to the present invention.

FIG. 7 shows a third preferred embodiment of the automatic vehicular velocity controlling apparatus according to the present invention.

In the third embodiment, the follow-up run managing procedure is modified as shown in FIG. 7. That is to say, steps S51 through S57 are interposed between the steps S7 and S8 described in the first embodiment. The other steps shown in FIG. 7 are the same as those in FIG. 2. The detailed description of the same numbered steps will herein be described.

At the step S51 shown in FIG. 7, the CPU of the second controller 20 compares a pressure decrease flag FD with "1" to determine whether the pressure decrease flag FD is set to "1". The pressure decrease flag FD is reset to "0" when the braking pressure is not in a pressure decrease state at an initial stage of the pressure decrease.

The pressure decrease flag FD is set to "1" when the braking pressure is in the pressure decrease state.

If FD="1" at the step S51 (Yes), the routine goes to a step S55.

If FD="0" at the step S51 (No), the routine goes to a step S52.

The CPU of the second controller 20 reads the target braking pressure $P_B^*$ in the follow-up run control procedure shown in FIG. 3 at the step S52.

At the next step S53, the CPU of the target braking pressure $P_B^*$ in the follow-up run control procedure shown in FIG. 3.

At the next step S54, the CPU of the second controller 20 assigns "1" to the pressure decrease flag FD to set the flag FD to "1".

Thus, the routine goes to the step S55.

At the step S55, the CPU of the second controller 20 subtracts a preset pressure decrease value $\Delta P_B$ (for example, a value corresponds to a pressure decrease velocity of the braking pressure which is about 0.5 MPa/S) from the present target braking pressure PB* as the new target braking pressure $P_B^*$ ($P_B^*=P_B^*-\Delta P_B$).

At the step S56, the CPU of the second controller 20 outputs the target braking pressure $P_B^*$ as the new target braking pressure $P_B^*$ to the braking controller 8 and the routine goes to the step S57. At the step S57, the CPU of the second controller 20 determines if the target braking pressure $P_B^*$ is zero.

If $P_B^*=0$ (Yes) at the step S57, the CPU of the second controller 20 determines that the vehicle is in the non-braking state and the routine goes to the step S58.

If $P_B^*>0$, the present interrupt routine of FIG. 7 is ended.

According to the third embodiment, the low $\mu$ road flag $F\mu$ is set to "1" in the same manner as described in the first or second embodiment and the first controller 19 executes any one of the anti-lock brake control, the braking force suppression control, and the sideslip angle suppression control.

At this time, the low $\mu$ road surface flag $F\mu$ is set to "1".

In addition, when the vehicle enters the low frictional coefficient road surface running condition, the routine of the step S7 to the step S51 is transferred so that the pressure decrease flag FD is reset to "0" since the pressure decrease operation is at the initial stage.

Hence, the CPU of the second controller 20, at the step S52, reads the target braking pressure $P_B^*$ calculated at the step S28 in the follow-up run control procedure shown in FIG. 3. Then, after the output of the target braking pressure $P_B^*$ at the follow-up run control procedure in FIG. 3 is inhibited to set the pressure decrease flag FD to "1".

Therefore, at the next processing time, the present routine directly jumps from the step S51 to the step S55.

At the step S55, the CPU of the second controller 20 subtracts the predetermined pressure decrease value $\Delta P_B$ from the target braking pressure $P_B^*$ to set the new target braking pressure $P_B^*$.

The subtraction result is outputted to the braking controller 8 to decrease the braking force generated by the braking controller 8.

If the pressure decrease processing is repeated and the target braking pressure $P_B^*$ indicates zero, the controller 20 determines that the braking control has been finished and the routine goes to the step S8 to release the follow-up run control.

As described above, according to the third preferred embodiment, while the vehicle has entered the run on the low frictional coefficient road surface, the follow-up run control procedure is in the braking control mode and the target braking pressure $P_B^*$ is gradually reduced so that the target braking pressure can moderately be reduced.

Therefore, the gradual decrease in the variation rate of the target braking pressure $P_B^*$ to widen the inter-vehicle distance occurs.

Consequently, the vehicular driver can recognize that the vehicle in the follow-up run control mode is directed to the release of the follow-up run control and a smooth transfer from the release of the follow-up run control to the normal run control by the vehicular driver's himself can be achieved. Thus, a driving safety can be assured.

Fourth Embodiment

Figure 8:
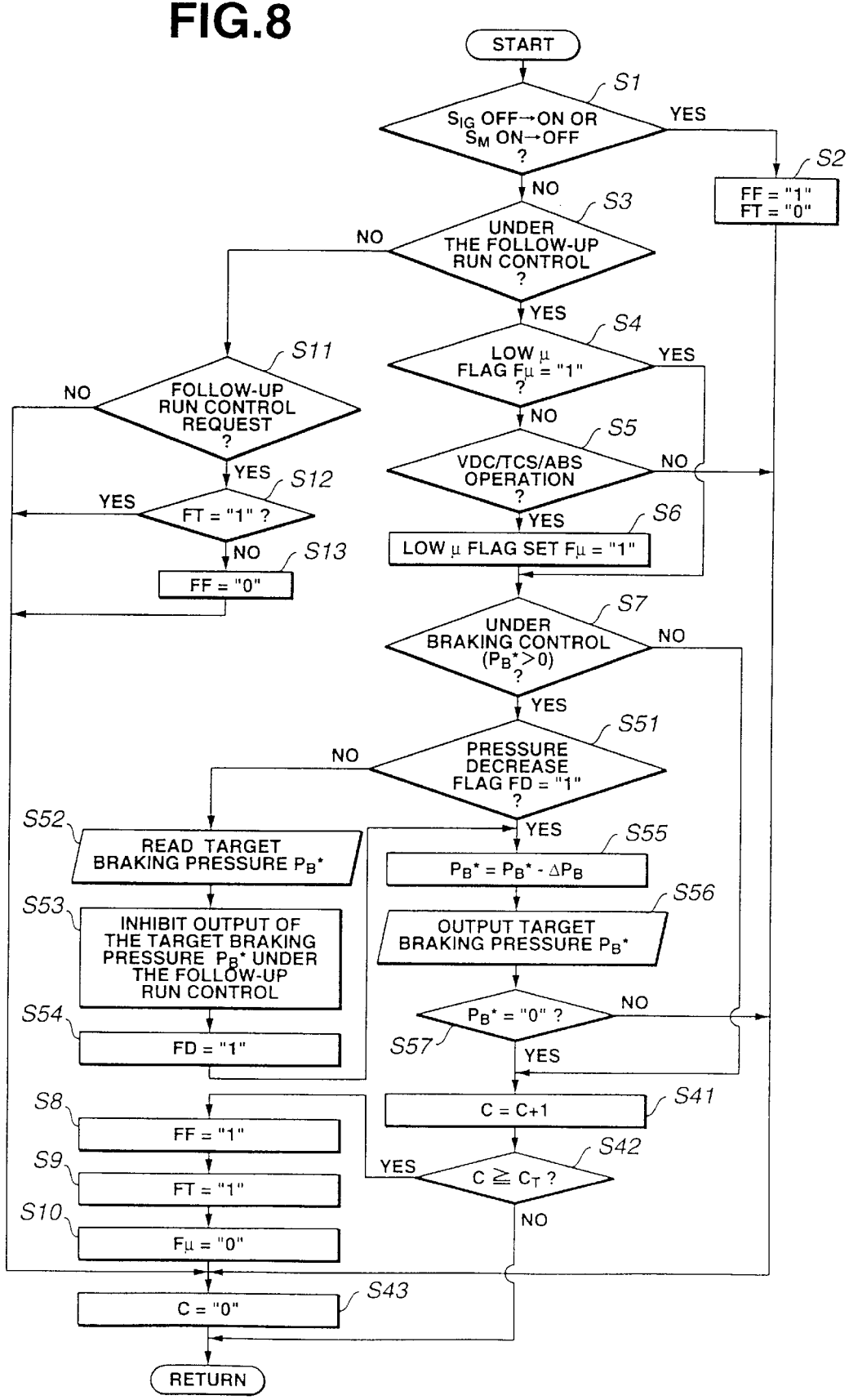
FIG. 8 is an operational flowchart representing a follow-up run managing procedure in a fourth preferred embodiment according to the present invention.

FIG. 8 shows a follow-up run managing procedure in a fourth embodiment of the automatic vehicular velocity controlling apparatus.

The fourth preferred embodiment is a combination of the second and third preferred embodiments described above.

In the fourth embodiment, in the follow-up run control procedure shown in FIG. 8, the steps S51 through S57 described in the third embodiment and the steps S41 and S42 described in the second embodiment are interposed between the steps S7 and S8 described in the first embodiment and the step S43 described in the second embodiment is added after the step S10. The other steps than those steps S51 through S57, S41, and S42 are the same as those described in the first embodiment with reference to FIG. 2. The detailed description of the same numbered steps as shown in FIGS. 2, 6, and 7 will herein be omitted.

In the fourth embodiment, in the same manner as described in the third embodiment, in a case where the vehicle runs on a low frictional coefficient road surface, the braking control is carried out in the follow-up run control procedure. At this time, the target braking pressure $P_B^*$ indicates zero and the braking control is finished. Then, when the preset interval of time by the delay counter has passed as described in the second embodiment ($C \geq C_T$), the follow-up run control is released.

Hence, the fourth embodiment can bring the vehicular driver to recognize that the follow-up run control is released. In addition, the braking restart is permitted in a short period of time at the follow-up run control on the low frictional coefficient road surface.

Fifth Embodiment

Figure 9:
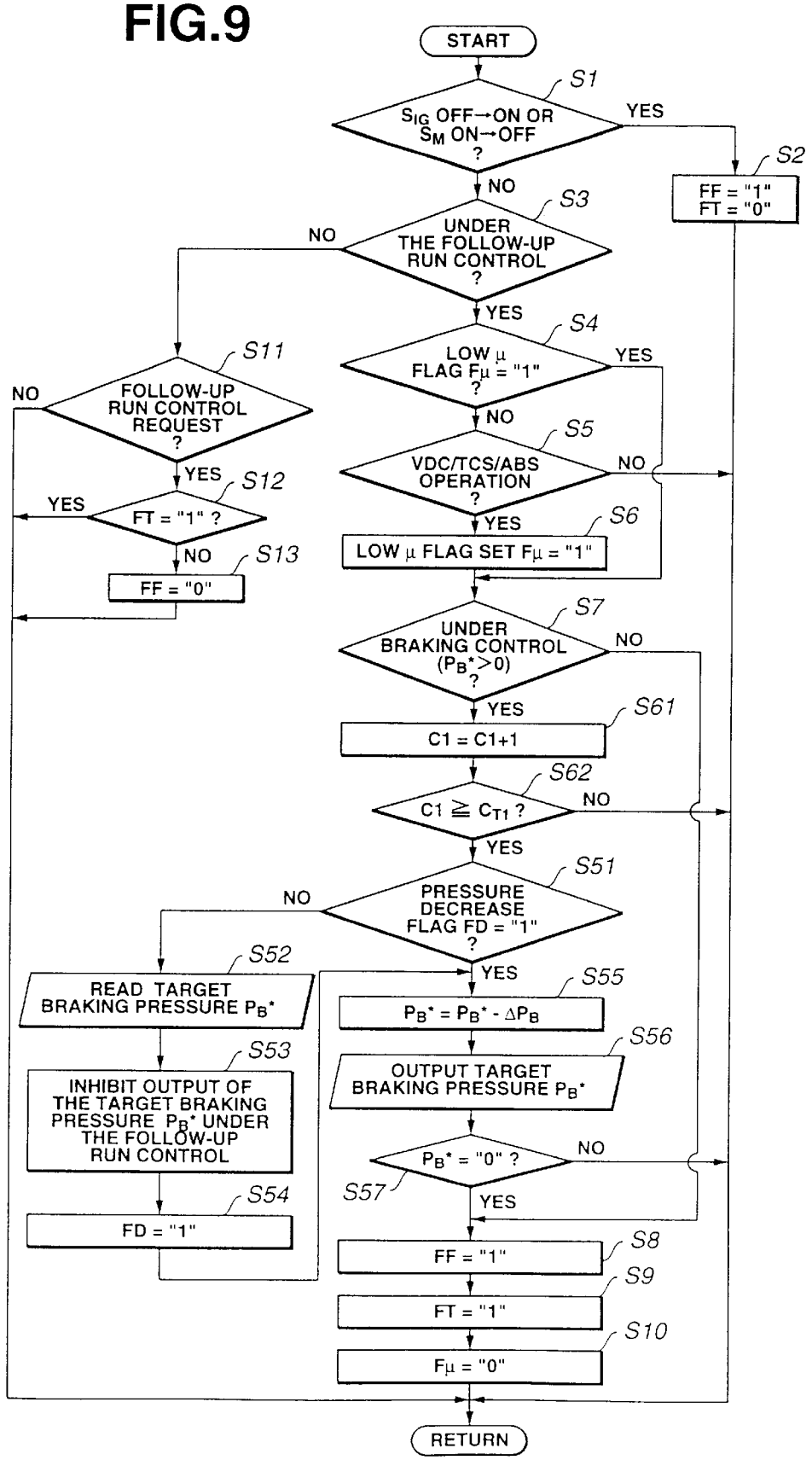
FIG. 9 is an operational flowchart of one example of a follow-up run managing procedure in a fifth preferred embodiment according to the present invention.

FIG. 9 shows the follow-up run managing procedure in a fifth preferred embodiment of the automatic vehicular velocity controlling apparatus according to the present invention.

In the fifth embodiment, new steps S61 and S62 to form a predetermined delay are interposed between the steps S7 and S51 shown in FIG. 7. The same processing as shown in FIG. 7 is carried out except the steps S61 and S62. the detailed description of the same numbered steps will herein be omitted.

At the step S61, the count value C1 of the counter which counts the delay time is incremented by one (C1+1→C1).

At the next step S62, the CPU of the second controller 20 determines whether the count value C1 of the delay counter has reached to a preset value GT1 (for example, corresponds to about 1 second).

If c1<CT1 at the step S62, the present timer interrupt routine is directly ended. If $C1 \geq CT1$ at the step S62, the CPU of the second controller 20 determines that a predetermined delay time interval has passed. Then, the routine goes to a step S51 to execute the pressure decrease processing of the target braking pressure $P_B^*$.

According to the fifth embodiment, when the vehicle runs on a low frictional coefficient road surface, the follow-up run control procedure is under the braking control procedure, the pressure decrease start timing is set to be retarded by the predetermined delay time. Hence, during this delay time, the inter-vehicle distance to the preceding vehicle can be assured according to the braking control in the follow-up run control procedure. Consequently, the smooth transfer to the normal running control by the driver himself during the release of the follow-up run control can be carried out.

It is noted that although the CPU of the second controller 20, in each of the first through fifth embodiments, determines whether the follow-up run control is under the braking control depending on whether the target braking pressure $P_B^*$ indicates positive. Alternatively, the CPU of the second controller 20 may determine that the follow-up run control is under the braking control only when the negative target vehicular velocity variation rate $G^*$ is calculated to widen the inter-vehicle distance D at the step S26 in the follow-up run control procedure shown in FIG. 3.

Sixth Embodiment

Figure 10:
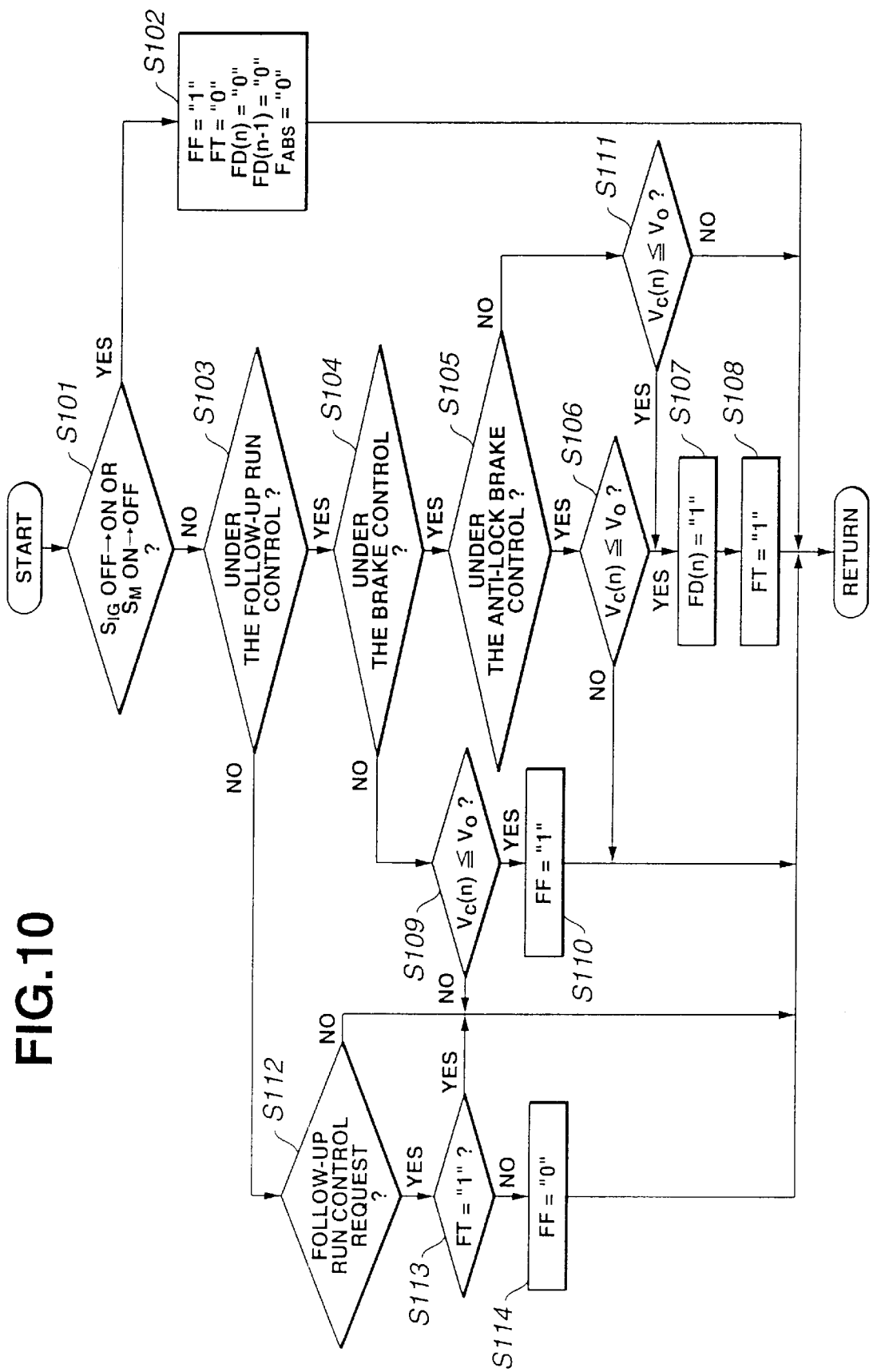
FIG. 10 is an operational flowchart of another example of a follow-up run managing procedure in a sixth preferred embodiment.
Figure 11:
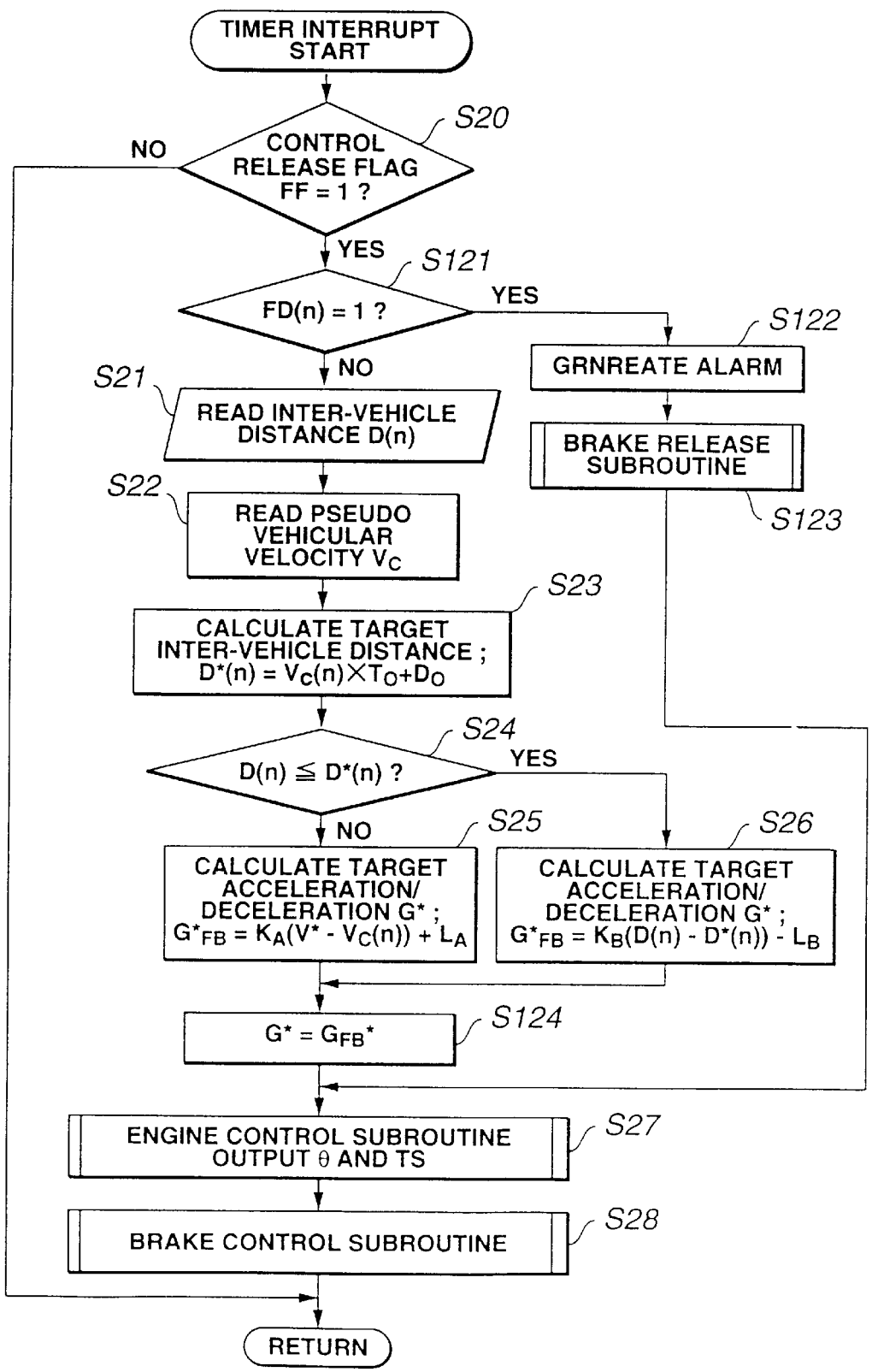
FIG. 11 is an operational flowchart of another example of the follow-up run control procedure in the sixth preferred embodiment.
Figure 12:
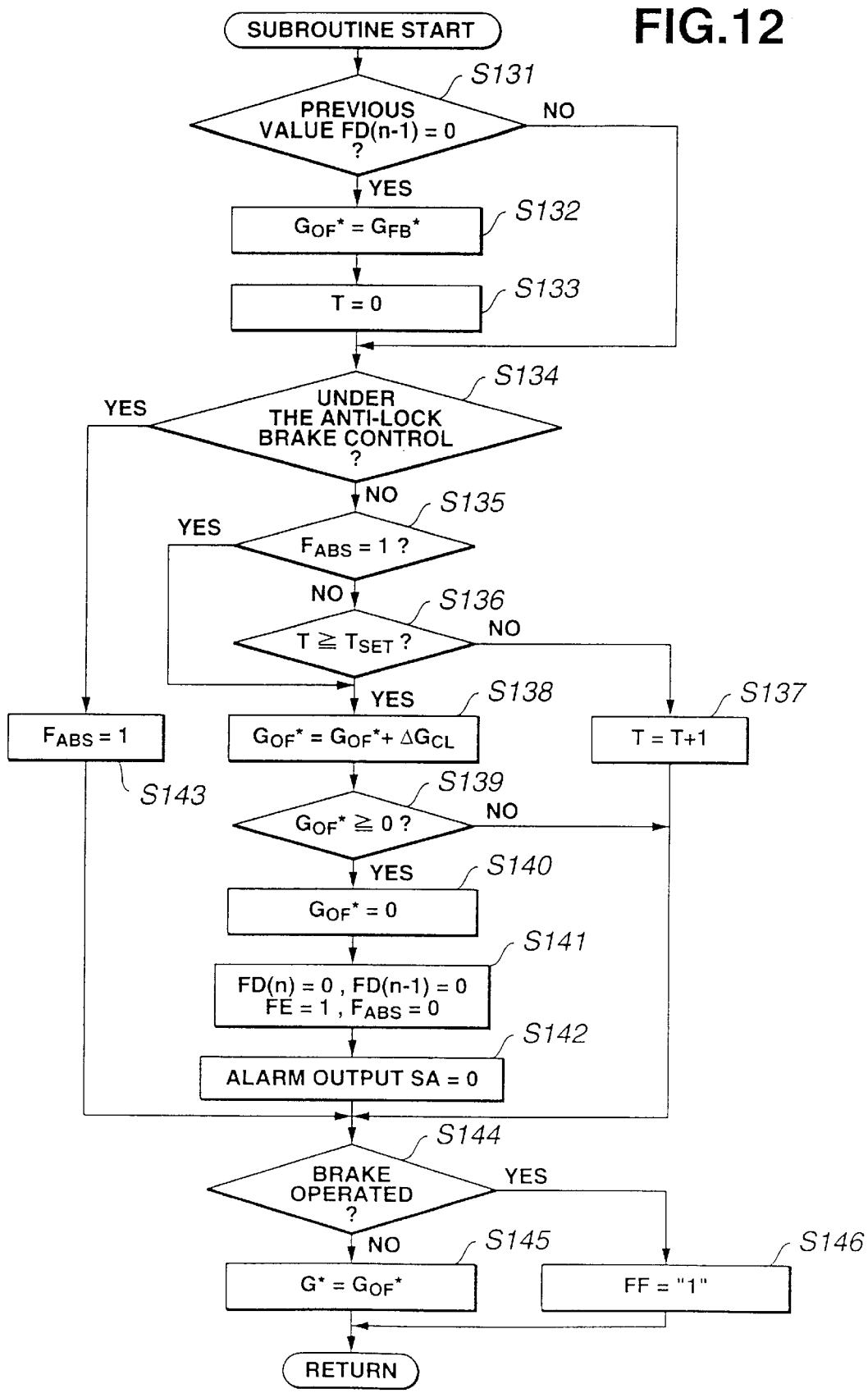
FIG. 12 is an operational flowchart of an example of a braking release subroutine shown in FIG. 11 in the sixth preferred embodiment.

FIGS. 10 through 12 show the operational flowcharts executed in a sixth preferred embodiment of the automatic vehicular velocity controlling apparatus according to the present invention.

In the sixth embodiment, when the anti-lock brake control is being executed while the vehicular velocity is reduced and becomes equal to or lower than a preset follow-up run control release vehicular velocity $V_0$, the follow-up run control is released after the anti-lock brake control is ended.

That is to say, in the sixth embodiment, the CPU of the second controller 20 determines whether the switch signal $S_{IG}$ of the ignition switch $SW_{IG}$ has changed from the off state to the on state or the switch signal $S_M$ of the main switch $SW_M$ has changed from the on state to the off state at a step S101 in FIG. 10 in the same way as the step S1 in FIG. 2.

If the result of determination indicates that the state change in the switch signal $S_{IG}$ occurs from the off state to the on state or the switch signal $S_M$ occurs from the on state to the off state (Yes) at the step S101, the routine of FIG. 10 goes to a step S102.

At the step S102, the CPU of the second controller 20 sets the follow-up run control release flag FF to "1" to represent the release of the follow-up run control, resets the operation history flag FT to "0", and resets the present and one previous values of pressure decrease flags FD(n) and FD(n−1) to "0"s so as to initialize these flags. Thereafter, the present timer interrupt routine is ended. If the switch signal $S_{IG}$ is changed from the on state to the off state, the switch signal $S_M$ is changed from the off state to the on state, or no state change occurs in the switch signals $S_{IG}$ and $S_M$ (No) at the step S101, the routine goes to a step S103.

At the step S103, the CPU of the second controller 20 determines whether the present time is under the control to follow up the preceding vehicle (the follow-up run control). This determination is based on whether the control release flag FF representing the follow-up run control active state when is reset to "0" is set to "1" or reset to "0".

If FF="0" (No) at the step S3, the CPU of the second controller 20 determines that the vehicle is under the follow-up run control and the routine goes to a step S104.

At the step S104, the CPU of the second controller 20 determines whether the present time is under the braking control in the follow-up run control according to whether the target braking pressure $P_B^*$ is positive or not at a braking control process (brake control subroutine) in the step S28 in FIG. 11.

During the braking control (viz., Yes at the step S104), the routine goes to a step S105 in which the CPU of the second controller 20 determines that the anti-lock brake control is being executed in the first controller 19. This determination is based on whether the execution status signal $SS_B$ is at the logical value of "1". This execution status signal $SS_B$ outputs the logical value of "1" from the first controller 19 when the anti-lock brake control is being executed. If the anti-lock brake control is being executed (Yes) at the step S105, the CPU of the second controller 20 determines that there is a possibility of vehicular running on the low frictional coefficient road surface and the routine goes to a step S106.

At the step S106, the CPU of the second controller 20 compares the pseudo vehicular body velocity Vc with the preset follow-up run control release velocity $V_0$ to determine whether $Vc>V_0$, or $Vc \leq V_0$.

If $Vc>V_0$ (No) at the step S106, the present timer interrupt routine of FIG. 10 is ended.

If $Vc \leq V_0$ (yes) at the step S106, the routine goes to a step S107.

At the step S107, FD(n)="1".

At the step S108, FT="1".

Then, the present interrupt routine is ended.

If the result of determination indicates that the anti-lock brake control is not executed at the step S105, the routine goes to the step S111.

At the step S111, the CPU of the second controller 20 determines if $Vc(n) \leq V_0$.

If $Vc>V_0$ (Yes) at the step S111, the present timer interrupt routine goes to the step S107 described above.

If the result of determination at the step S103 does not indicate that the follow-up run control is being executed (No), the routine goes to steps S112 through S114.

The steps S112, S113, and S114 are the same contents as the steps S11, S12, and S13 shown in FIG. 2 and their detailed description will herein be omitted.

FIG. 11 shows the follow-up run control procedure executed in the sixth embodiment.

As shown in FIG. 11, a new step S121 to determine if the pressure decrease flag FD is interposed between the steps S20 and S21 shown in FIG. 3.

If the result of determination at the step S121 indicates that the pressure decrease flag FD(n) is reset to "0", the routine goes to the step S21. If FD(n)="1", the routine goes to a step S122. After the alarm to inform the vehicular driver (passenger) of the start of pressure decrease is issued, the routine goes to a step S27. Furthermore, the CPU of the second controller 20 calculates the target vehicular velocity variation rate as $G_{FB}^*$ calculated at steps S25 and S26 as the target vehicular velocity variation rate $G^*$. Except this step S124, the same numbered steps in FIG. 11 are carried out in the same contents as shown in FIG. 3. The detailed description thereof will herein be omitted.

FIG. 12 shows a specific example of the braking release process at the step S123 (brake release subroutine).

That is to say, first, at a step S131 in FIG. 12, the CPU of the second controller 20 reads the previous value FD(n−1) of the pressure decrease flag to determine whether FD(n−1)= "0" or FD(n−1)="1".

If this is reset to "0" at the step S131 (Yes), the routine goes to the step S132 (viz., $G_{OF}^*=G_{FB}^*$). If T=0 at the step S133, the routine goes to a step S134.

It is noted that FD(n−1)=0 at the step S131 means that it is the first time for the braking pressure to be in the pressure decrease control state. At the step S132, the target vehicular velocity variation rate $G_{FB}^*$ calculated at the step S26 in FIG. 11 is set as a control release purpose target vehicular velocity variation rate $G_{OF}^*$ This is stored into the control release purpose target vehicular velocity variation rate $G_{OF}^*$ memory location to update the previously stored same.

Then, the routine goes to the step S133 in which the count value T of a hold duration timer is cleared to zero (T=0). Then, the routine goes to a step S134.

At the step S134, the CPU of the second controller 20 determines whether the execution signal $SS_B$ outputted from the first controller 19 indicates the logical value of "1" to determine whether the anti-lock brake control is being executed.

If the CPU of the second controller 20 determines that the anti-lock brake control is not being executed, the routine goes to a step S143. If not the anti-lock brake control or the anti-lock brake control is ended, the routine goes from the step S134 to the step S135.

At the step S135, the CPU of the second controller 20 determines whether an anti-lock brake flag $F_{ABS}$ set to "1" when the anti-lock brake control is started is set to "1". If $F_{ABS}=0$ (No) at the step S135, the routine goes to a step S136. If $F_{ABS}=1$ (Yes) at the step S135, the routine branches to a step S138.

At the step S136, the CPU of the second controller 20 determines whether the count value T of the hold timer is equal to or longer than a set value $T_{SET}$ set as a time duration sufficient for the vehicular driver to recognize a preset alarm sound (or flicker light).

If $T<T_{SET}$ at the step S136 (No), the routine goes to a step S137.

At the step S137, the count value T is incremented by one (T+1→T). Then, the routine jumps to a step S144.

On the other hand, if the result of determination at the step S135 indicates that the anti-lock brake flag $F_{ABS}$ is set to "1" and if the result of determination indicates that $T \geq T_{SET}$ at the step S136, the routine goes to a step S138.

As expressed in the equation (4) described below, a value of an addition of a predetermined value $\Delta G_{CL}$ preset to the present target vehicular velocity variation rate $G_{OF}^*$ stored in the control release purpose target vehicular velocity memory location is stored into the control release purpose target vehicular velocity variation rate stored memory location to update the previously stored same and the routine goes to a step S139.

$$G_{OF}^* = G_{OF}^* + \Delta G_{CL} \qquad (4).$$

At the step S139, the CPU of the second controller 20 determines if the target vehicular velocity variation rate $G_{OF}^*$ is equal to zero or greater than zero (0).

If $G_{OF}^* \geq 0$ (Yes) at the step S139, the CPU of the second controller 19 determines the braking release end and the routine goes to a step S140.

The control release purpose target vehicular velocity variation rate $G_{OF}^*$ is set to 0 at the step S140.

At the step S141, the pressure decrease flags FD(n) and FD(n−1) are reset to "0" and the follow-up run control release flag FF are set to "1". Next, at the step S142, either the alarm sound or the alarm display is performed. Then, the routine goes to a step S144.

If $G_{OF}^*<0$ at the step S139, the CPU of the second controller 20 determines that the present time is in a midway through the recovery to the anti-lock brake control and the routine goes directly to the step S144.

In addition, if the result of determination at the step S134 indicates that the present time is under the anti-lock bake control, the routine goes to the step S143 to set the anti-lock brake flag $F_{ABS}$ to "1" and the routine goes to the step S144.

At the step S144, the CPU of the second controller 20 determines if the brake operation is carried out, i.e., if a depression of the brake pedal (brake pedal manipulation) is carried out depending on whether a vehicular brake switch signal, e.g., a switch signal of a vehicular brake lamp is turned on. If the brake pedal is not depressed (No) at the step S144, the target vehicular velocity variation rate $G_{OF}^*$ is stored into the control release purpose target vehicular velocity variation rate G* to update the previously stored $G_{OF}^*$ to end the braking release processing ($G^*=G_{OF}^*$). The, the processing is transferred to the step S27 shown in FIG. 11.

If the brake pedal is depressed (Yes) at the step S144, the routine goes to a step S146 at which the follow-up run control release flag FF is set to "1" and the present subroutine returns to the step S27 shown in FIG. 11.

According to the sixth embodiment, suppose that the control release flag FF is reset to "0" at a time point t0 as shown in FIG. 13 and the pseudo vehicular body velocity Vc(n) is in the follow-up run control state at the vehicular velocity which is equal to or higher than the set vehicular velocity $V_0$.

Then, suppose also that the inter-vehicle distance D to the preceding vehicle is made coincident with the target inter-vehicle distance D* to run constantly at the target inter-vehicle distance D* (cruise speed run).

Under the cruise speed run, the control release flag FF is reset to "0" and the pressure decrease flag FD(n) is reset to "0". Hence, at the follow-up run control procedure shown in FIG. 11, the routine goes to the step S21 via the steps S20 and S121. The target vehicular velocity variation rate $G_{FB}^*$ is calculated at the step S26 on the basis of the inter-vehicle distance D(n) and the target inter-vehicle distance D*. The engine control processing is carried out on the basis of the calculated target vehicular velocity variation rate $G_{FB}^*$.

Figures 13A, 13B:
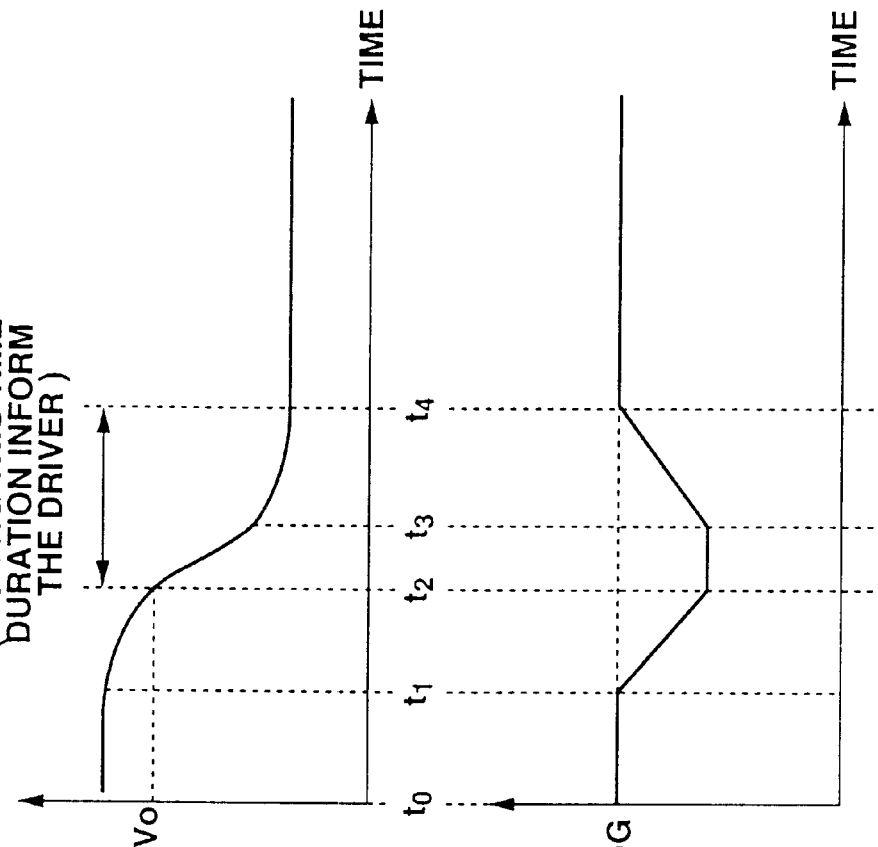
FIGS. 13A and 13B are integrally a timing chart representing a vehicular velocity Vc and a target acceleration/deceleration for explaining an operation in the case of sixth preferred embodiment.

If the present preceding vehicle is decelerated at a time point t1 shown in FIGS. 13A and 13B or another vehicle running on another traffic lane is interrupted on the same traffic lance before the vehicle, so that the inter-vehicle distance D is reduced than the target inter-vehicle distance D*.

Suppose now that, at the follow-up run control procedure shown in FIG. 11, the target vehicular velocity variation rate $G_{FB}^*$ representing the negative deceleration is calculated as shown in FIG. 13B. This target vehicular velocity variation rate $G_{FB}^*$ is set as the target vehicular velocity variation rate G*. Hence, at the step S28, the target braking pressure $P_B^*$ corresponding to the target vehicular velocity variation rate $G_{FB}^*$ is calculated.

This is supplied to the braking controller 8. Hence, the braking pressure of the disc brake 7 of each road wheel is controlled to coincide with the target braking pressure $P_B^*$ so as to be under the braking effecting state. In response to the braking effecting state, the pseudo vehicular body velocity Vc(n) is decelerated as shown in FIG. 13A.

During the brake control state, at the follow-up run managing procedure shown in FIG. 10, the routine goes from the step S104 to the step S105.

If the anti-lock brake control is not operated, the routine goes to the step S111.

Since the pseudo vehicular body velocity Vc(n) is in excess of the follow-up run control release vehicular velocity $V_0$, the timer interrupt routine is directly ended so that the state in which the pressure decrease flag FD(n) is reset to "0" is maintained. Hence, even at the follow-up run control procedure shown in FIG. 11, the braking control based on the target vehicular velocity variation rate $G_{FB}^*$ is continued.

While the brake control procedure is carried out during the vehicular run on the low frictional coefficient road surface, the first controller 19 executes the anti-lock brake control procedure. At the follow-up run managing procedure shown in FIG. 10, the routine goes from the step S104 to the step S106 via the step S105. Since the pseudo vehicular body velocity Vc(n) is in excess of the follow-up run control release vehicular velocity $V_0$, the timer interrupt processing is directly ended.

Since the pressure decrease flag FD (n) is maintained at a state in which the pressure decrease flag FD(n) is reset to "0". Hence, even at the follow-up run control procedure shown in FIG. 11, the braking control on the basis of the target vehicular velocity variation rate $G_{FB}^*$ is continued.

During the brake control at the follow-up run managing procedure shown in FIG. 10, the routine goes from the step S104 to the step S105. However, while the anti-lock brake control is not operated, the present routine goes to the step S111. Since the pseudo vehicular body velocity Vc(n) is in excess of the follow-up run control release vehicular velocity $V_O$, the timer interrupt routine is directly ended. Since the pressure decrease flag FD(n) is maintained at the reset state of "0", the braking control is continued on the basis of the target vehicular velocity variation rate $G_{FB}{}^*$ calculated at the step S26 even at the follow-up run control procedure shown in FIG. 11.

If, during the braking control procedure, the vehicle runs on the low frictional coefficient road surface and the second controller 19 executes the anti-lock brake control procedure.

The first controller 19 executes the anti-lock brake control process with the vehicular run on the low frictional coefficient road surface during the brake control operation. At this time, at the follow-up run managing procedure of FIG. 10, the routine goes to the step S106 from the step S104 via the step S105. However, since the pseudo vehicular body velocity Vc(n) is in excess of the follow-up run control purpose release vehicular velocity $V_O$, the present timer interrupt routine shown in FIG. 10 is directly ended. Since the pressure decrease flag FD(n) is maintained at the reset state of "0", the braking control is continued on the basis of the target vehicular velocity variation rate $G_{FB}{}^*$ calculated at the step S26.

During the velocity deceleration state, when the pseudo vehicular body velocity Vc(n) is equal to or greater than the set vehicular velocity $V_O$ at a time point t2, the timer interrupt routine goes from the step S106 to the step S107 in which the pressure decrease flag FD(n) is set to "1" and the operation history flag FT is set to "1" at the next step S108.

Hence, when the follow-up run control process shown in FIG. 11 is executed, the status of the pressure decrease flag FD(n) is changed from "0" to "1" and the operation history flag, then, set to "1".

Therefore, when the follow-up run control procedure shown in FIG. 11 is executed, the status of the pressure decrease flag FD(n) is set from "0" to "1" so that the routine shown in FIG. 11 is transferred from the step S121 to the step S122.

At the step S122, the alarm by means of the sound or display is issued.

At the next step S123, the braking release procedure of FIG. 12 is executed.

In the brake release process since the previous pressure decrease flag FD(n-1) indicates "0", the routine goes from the step S131 to the step S132 shown in FIG. 12.

At the step S132, the target vehicular velocity variation rate $G_{FB}{}^*$ calculated at the step S26 as the braking release purpose target vehicular velocity variation rate $G_{OF}{}^*$ is set. This value of $G_{OF}{}^*$ is stored into the control release purpose target vehicular velocity variation rate memory location of the memory so as to update the memory contents thereof. At the next step S133, the count value T of the timer setting the hold time is cleared to "0".

Thereafter, if the count value T of the hold timer is equal to or greater than the set value $T_{SET}$, the routine goes from the step S136 to the step S138 at the process of FIG. 8. In the same way as the anti-lock brake control is released, the control release-purpose target vehicular velocity variation rate $G_{OF}{}^*$ is incremented by $\Delta G_{CL}$.

If the control release purpose target vehicular velocity variation rate $G_{OF}{}^*$ indicates zero or positive, the braking release processing is ended. Together with the release of the follow-up run control, the abrupt change in the target vehicular velocity variation rate can be prevented from occurring so as to enable the running stability to be secured.

Furthermore, in a case where the brake pedal is depressed to effect the brake manipulation with the driver during the execution of the braking release process of FIG. 12, the routine in FIG. 12 goes from the step S144 to the step S144 in which the follow-up run release flag FF is set to "1".

Thus, if the follow-up run release flag FF is set to "1", the follow-up run control flag FF shown in FIG. 11 is immediately released to return to the normal vehicular running condition.

Furthermore, in a case where the follow-up run control of FIG. 11 is executed, the vehicle runs on, for example, an ascending slope with the braking control not carried out so that the pseudo vehicular body velocity Vc(n) is equal to or less than the follow-up run release purpose vehicular velocity $V_O$. At this time, at the follow-up run managing procedure in FIG. 10, the routine goes from the step S104 to the step S110 via the step S109. Hence, since the follow-up run release flag FF is set to "1", the follow-up run control is immediately released.

It is noted that, as described in the sixth embodiment, the set value $V_{SET}$ to determine the hold time duration indicates constant. However, the set value $T_{SET}$ may alternatively be varied according to the brake release purpose target vehicular velocity variation rate $G_{OF}{}^*$.

It is also noted that, in each embodiment described above, the target inter-vehicle distance $D^*$ is calculated and the target vehicular variation rate $G^*$ is calculated by comparing the target inter-vehicle distance $D^*$ with the actual inter-vehicle distance D to calculate the target vehicular velocity variation rate $G^*$.

However, the target vehicular velocity $V^*(n)$ may alternatively be determined so that the time duration (inter-vehicle time duration) for the vehicle to reach to the distance $L_O$ meters behind the preceding vehicle on the basis of the inter-vehicle distance D(n). An engine output command value $\alpha$ is calculated on the basis of a deviation $\Delta V(n)$ between the target vehicular velocity V(n) and the deviation $\Delta V(n)$. If the deviation $\Delta V(n)$ indicates positive, the engine may be calculated to be in the acceleration state on the basis of the calculated engine output command value $\alpha$. If the engine output command value $\alpha$ is negative, the target braking pressure may be set according to the PD (proportional-differential) control or PID (proportional-integration-differential) control on the basis of the velocity deviation $\Delta V(n)$.

Furthermore, in each of the first through sixth embodiments, the pseudo vehicular velocity Vc is calculated on the basis of four road wheel velocities $VW_{FL}$ through $VW_{RR}$.

However, the average value of the road wheel velocity on the non-driven wheels may be calculated as the vehicular velocity, the revolution speed of the output shaft of the automatic transmission may be detected to determine the vehicular body velocity, or a longitudinal acceleration may be integrated to determine the longitudinal acceleration.

Furthermore, although, in each of the first through sixth embodiments, two road surface condition running control process, e.g., the driving force control procedure and the sideslip state control procedure are executed, any one or the other process may be executed.

However, the road surface condition may be detected on the basis of the revolution velocity difference between the front and rear road wheels used in the driving force control or on the basis of the revolution speed difference.

Furthermore, in each of the first through sixth embodiments, the first controller 19 calculates the sideslip angle in the sideslip angle suppression control procedure so that the sideslip angle is made coincident with the target sideslip angle.

However, the first controller 19 may calculate a target yaw rate on the basis of the target angular displacement θ and may control the driving force so that the yaw rate ψ detected by the yaw rate sensor 14 is made coincident with the target yaw rate.

Figure 1C:
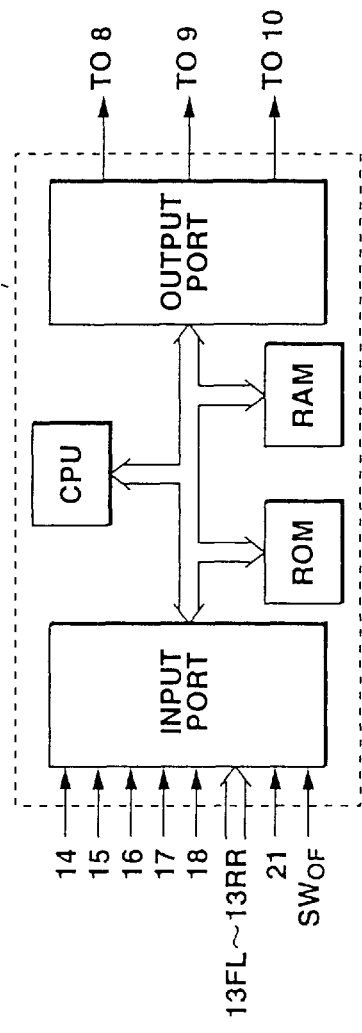

In each of the first and sixth embodiments, two controllers of the first controller 19 and second controller 20 are installed. However, a single controller may be installed to execute all of the driving force control, the road surface situation-dependent control (anti-lock brake control) the sideslip angle suppression control, and the follow-up run control, as shown in FIG. 1C.

In each of the first through sixth embodiments, the follow-up run managing procedure manages to execute the follow-up run control procedure.

Both procedures may, however, be integrated as a single procedure.

In each of the first through sixth embodiments, the two main switch $SW_M$ and the set switch SWs may be applied. However, either of the two switches may be omitted.

In each of the first through sixth embodiments, the automatic transmission 3 is installed on the output end of the engine 2. However, a continuously variable transmission may be applied to the output end of the engine 2.

In each of the first through sixth embodiments, the present invention is applicable to the rear-wheel-drive vehicle. However, the present invention may be applied to a front-wheel-drive vehicle or a four-wheel drive (4WD) vehicle. Furthermore, the present invention may be applied to a hybrid vehicle in which both of the engine 2 and an electric motor are used. In this case, in place of the single engine output controller, a motor controller may be used in addition to the engine (output) controller. The present invention may be applied to an electric vehicle. In this case, the engine output controller may be replaced with the electric motor controller.

It is noted that the term of the vehicular run control includes the follow-up run control.

The entire contents of a Japanese Patent Application No. Heisei 11-008370 (filed in Japan on Jan. 14, 1999) are herein incorporated by reference.

Although the present invention has been described above by reference to certain embodiments of the present invention, the present invention is not limited to the embodiments described above.

Modifications and variations of the embodiments described above will occur to those skilled in the art, in the light of the above teachings. The scope of the present invention is defined with reference to the following claims.

What is claimed is:

1. An apparatus for automatically controlling a vehicular velocity for a vehicle, comprising:
   an inter-vehicle distance detector to detect an inter-vehicle distance of the vehicle to a preceding vehicle which is running ahead of the vehicle;
   a target vehicular velocity variation rate calculating section that calculates a target vehicular velocity variation rate to make the detected inter-vehicle distance substantially equal to a target inter-vehicle distance;
   a vehicular run controlling section that is enabled to perform a vehicular run control to maintain the target vehicular velocity variation rate;
   a release condition detector to detect whether a release condition of the vehicular run control by the vehicular run controlling section is established; and
   a vehicular run control releasing section that releases the vehicular run control at a time at which a vehicular deceleration control is completed, on condition that the vehicular run controlling section is detected to be performing the vehicular deceleration control and the release condition detector detects that the release condition is established.

2. An apparatus for automatically controlling a vehicular velocity for a vehicle as claimed in claim 1, wherein the vehicular run control releasing section includes a gradual vehicular run control releasing section that reduces the target vehicular velocity variation rate in the vehicular run control by a predetermined gradient for each predetermined interval of time in such a manner that a variation of the vehicular deceleration is relatively moderate when the vehicular run controlling section is detected to be performing the vehicular deceleration control while the release condition detector detects that the release condition is established and, thereafter, releases the vehicular run control when the target vehicular velocity variation rate of the vehicular run control is reduced to reach to zero.

3. An apparatus for automatically controlling a vehicular velocity for a vehicle as claimed in claim 1, wherein the vehicular run control releasing section includes a gradual vehicular run control releasing section that reduces the target vehicular velocity variation rate in the vehicular run control by a predetermined gradient for each predetermined interval of time in such a manner that a variation of the vehicular deceleration is relatively moderate from a time at which a predetermined delay in time has passed when the vehicular run controlling section is detected to be performing the vehicular deceleration control while the release condition detector detects that the release condition is established and, thereafter, releases the vehicular run control when the target vehicular velocity variation rate in the vehicular run control is reduced to reach to zero.

4. An apparatus for automatically controlling a vehicular velocity for an automotive vehicle as claimed in claim 1, wherein the release condition detector includes a road surface situation detector to detect whether the vehicle is running on a slippery road surface having a frictional coefficient lower than a predetermined frictional coefficient.

5. An apparatus for automatically controlling a vehicular velocity for a vehicle as claimed in claim 1, further comprising a road surface situation-dependent controlling section that is enabled to perform the vehicular run control according to a frictional coefficient of a road surface on which the vehicle is running and wherein the release condition detector includes a control state detector to detect whether the road surface situation-dependent controlling section is in its control active state according to the frictional condition of the road surface having a frictional coefficient lower than a predetermined frictional coefficient.

6. An apparatus for automatically controlling a vehicular velocity for a vehicle as claimed in claim 1, further comprising a braking control detector to detect whether the vehicular run controlling section is in the brake control to decelerate the vehicle and wherein the vehicular run control releasing section releases the vehicular run control after a predetermined interval of time has passed from a time at which the braking control by the vehicular run controlling section is ended.

7. An apparatus for automatically controlling a vehicular velocity for a vehicle as claimed in claim 4, further comprising a deceleration control state detector to detect whether the vehicular run controlling section is performing the vehicular deceleration control when the release condition detector detects that the release condition is established and wherein the vehicular run control releasing section releases the vehicular run control at the time at which the vehicular deceleration control is completed when the deceleration control state detector detects that the vehicular run controlling section is performing the vehicular deceleration control.

8. An apparatus for automatically controlling a vehicular velocity for a vehicle as claimed in claim 7, further comprising a control active state detector to detect whether any one of an anti-lock brake control, a traction control, and a sideslip angle suppression control is executing; and wherein the road surface situation detector detects whether the vehicle is running on the slippery road surface having the frictional coefficient lower than the predetermined frictional coefficient when the control active state detector detects that any one of the anti-lock brake control, the traction control, and the sideslip angle suppression control is executing.

9. An apparatus for automatically controlling a vehicular velocity for a vehicle as claimed in claim 8, further comprising a braking control state detector to detect whether the vehicular run controlling section is performing a braking control to decelerate the vehicle when the road surface situation detector detects that any one of the anti-lock brake control, the traction control, and the sideslip angle suppression control is executing.

10. An apparatus for automatically controlling a vehicular velocity for a vehicle as claimed in claim 9, wherein the braking control state detector detects whether the vehicular run controlling section is performing the braking control to decelerate the vehicle according to whether a target braking pressure $P_B^*$ calculated by the vehicular run controlling section for a vehicular brake system to decelerate the vehicle is positive.

11. An apparatus for automatically controlling a vehicular velocity for a vehicle as claimed in claim 9, wherein when the target braking pressure $P_B^*$ is positive, the braking control state detector detects that the vehicular run controlling section is performing the braking control to decelerate the vehicle and when the target braking pressure $P_B^*$ crosses zero, the braking control state detector detects that the vehicular run controlling section is not performing the braking control to decelerate the vehicle but detects that the braking control by the vehicular run controlling section is ended and wherein the vehicular run controlling section is released when the braking state detector detects that the braking control is ended.

12. An apparatus for automatically controlling a vehicular velocity for a vehicle as claimed in claim 11, further comprising a first timer C to measure a time duration which corresponds to a predetermined interval of time from a time at which the target braking pressure $P_B^*$ crosses zero and wherein the vehicular run controlling section is released when the predetermined interval of time by the measurement of the first timer C has passed.

13. An apparatus for automatically controlling a vehicular velocity for a vehicle as claimed in claim 12, further comprising a braking pressure decreasing section that decreases the target braking pressure $P_B^*$ by a predetermined pressure decrease coefficient $\Delta P_B$ for each predetermined interval of time when the braking control state detector detects that the target braking pressure $P_B^*$ indicates positive and wherein the vehicular run controlling section is released when the target braking pressure $P_B^*$ reduced by the predetermined pressure decrease coefficient $\Delta P_B$ indicates from a positive value to zero.

14. An apparatus for automatically controlling a vehicular velocity for a vehicle as claimed in claim 13, further comprising a second timer to measure another time duration which corresponds to another predetermined interval of time from a time at which the reduced target braking pressure $P_B^*$ indicates from a positive value to zero and wherein the vehicular run controlling section is released when the predetermined interval of time by the measurement of the second timer C is passed.

15. An apparatus for automatically controlling a vehicular velocity for a vehicle as claimed in claim 11, further comprising: a first timer C to measure a time duration which corresponds to a predetermined interval of time from a time at which the target braking pressure $P_B^*$ indicates positive to detect that the vehicular run controlling section is in the braking control; and a braking pressure decreasing section that decreases the target braking pressure $P_B^*$ by a predetermined pressure decrease coefficient $\Delta P_B$ for each predetermined interval of time when the first timer C measures the time duration which corresponds to the predetermined interval of time.

16. An apparatus for automatically controlling a vehicular velocity for a vehicle as claimed in claim 5, further comprising: a vehicular velocity detector to detect a present vehicular velocity Vc(n) of the vehicle; and a vehicular velocity comparator to compare the present vehicular velocity Vc(n) with a preset vehicular run control release velocity $V_o$ to determine whether the present vehicular velocity Vc(n) is equal to or lower than the preset vehicular run control release velocity $V_o$ and wherein when the control state detector detects that the road surface situation-dependent controlling section is in its control active state and the vehicular velocity comparator determines that the present vehicular velocity Vc(n) is equal to or lower than the preset vehicular run control release velocity $V_o$, the vehicular run control releasing section releases the vehicular run control after the road surface situation-dependent controlling section ends its control active state.

17. An apparatus for automatically controlling a vehicular velocity for a vehicle as claimed in claim 16, further comprising a braking control state detector to detect whether the vehicular run controlling section is in a brake control state to decelerate the vehicle and wherein the vehicular velocity comparator determines whether the present vehicular velocity Vc (n) of the vehicle is equal to or lower than the preset vehicular run control release velocity $V_O$ after the braking control state detector detects whether the vehicular run controlling section is in the braking control state to decelerate the vehicle and the control state detector detects whether the road surface situation-dependent controlling section is in its control active state.

18. An apparatus for automatically controlling a vehicular velocity for a vehicle as claimed in claim 17, further comprising an alarm circuit to produce an alarm to inform the vehicular driver of the release of the vehicular run control by the vehicular run controlling section when the braking control state detector detects that the vehicular run controlling section is in the braking control state to decelerate the vehicle, the control state detector detects that the road surface-dependent controlling section is in its control active state, and that the vehicular velocity comparator determines that the present vehicular velocity Vc(n) is equal to or lower than the preset vehicular run control release velocity $V_O$ and the target vehicular velocity variation rate G* calculated by the target vehicular velocity variation rate calculating section indicating a negative value is held at the same time as the alarm circuit produces the alarm until the road surface situation-dependent controlling section ends its control active state.

19. An apparatus for automatically controlling a vehicular velocity for a vehicle, comprising:

inter-vehicle distance detecting means for detecting an inter-vehicle distance of the vehicle to a preceding vehicle which is running ahead of the vehicle;

target vehicular velocity variation rate calculating means for calculating a target vehicular velocity variation rate to make the detected inter-vehicle distance substantially equal to a target inter-vehicle distance;

vehicular run controlling means for performing a vehicular run control to maintain the target vehicular velocity variation rate;

release condition detecting means for detecting whether a release condition of the vehicular run control by the vehicular run controlling means is established; and vehicular run control releasing means for releasing the vehicular run control at a time at which a vehicular deceleration control is completed, on condition that the vehicular run controlling means is detected to be performing the vehicular deceleration control and the release condition detecting means detects that the release condition is established.

20. A method for automatically controlling a vehicular velocity for a vehicle, comprising:

detecting an inter-vehicle distance of the vehicle to a preceding vehicle which is running ahead of the vehicle;

calculating a target vehicular velocity variation rate to make the detected inter-vehicle distance substantially equal to a target inter-vehicle distance;

performing a vehicular run control to maintain the target vehicular velocity variation rate;

detecting whether a release condition of the vehicular run control is established; and releasing the vehicular run control at a time at which a vehicular deceleration control to perform the vehicular run control is completed, on condition that the vehicular deceleration control is being performed and the release condition is established.

21. An apparatus for automatically controlling a vehicular velocity for a vehicle, comprising:

an inter-vehicle distance detector to detect an inter-vehicle distance of the vehicle to a preceding vehicle which is running ahead of the vehicle;

a target vehicular velocity variation rate calculating section that calculates a target vehicular velocity variation rate to make the detected inter-vehicle distance substantially equal to a target inter-vehicle distance;

a vehicular run controlling section that is enabled to perform a vehicular run control to maintain the target vehicular velocity variation rate;

a release condition detector to detect whether a release condition of the vehicular run control by the vehicular run controlling section is established;

a vehicular deceleration control detector to detect whether a deceleration control by the vehicular run control is executed; and a vehicular run control releasing section that releases the vehicular run control gradually when the release condition of the vehicular run control is detected on condition that the vehicular deceleration control is being executed.

22. An apparatus for automatically controlling a vehicular velocity for a vehicle, comprising:

inter-vehicle distance detecting means for detecting an inter-vehicle distance of the vehicle to a preceding vehicle which is running ahead of the vehicle;

target vehicular velocity variation rate calculating means for calculating a target vehicular velocity variation rate to make the detected inter-vehicle distance substantially equal to a target inter-vehicle distance;

vehicular run controlling means for performing a vehicular run control to maintain the target vehicular velocity variation rate;

release condition detecting means for detecting whether a release condition of the vehicular run control by the vehicular run controlling means is established;

vehicular deceleration control detection means for detecting whether a deceleration control by the vehicular run control is executed; and vehicular run control releasing means for releasing the vehicular run control gradually when the release condition of the vehicular run control is detected on condition that the vehicular deceleration control is being executed.

23. A method for automatically controlling a vehicular velocity for a vehicle, comprising:

detecting an inter-vehicle distance of the vehicle to a preceding vehicle which is running ahead of the vehicle;

calculating a target vehicular velocity variation rate to make the detected inter-vehicle distance substantially equal to a target inter-vehicle distance;

performing a vehicular run control to maintain the target vehicular velocity variation rate;

detecting whether a release condition of the vehicular run control is established;

detecting whether a deceleration control by the vehicular run control is executed; and releasing the vehicular run control gradually when the release condition of the vehicular run control is detected on condition that the vehicular deceleration control is being executed.

* * * * *